United States Patent [19]

Wong et al.

[11] Patent Number: 4,888,790
[45] Date of Patent: Dec. 19, 1989

[54] TIMING RECOVERY SYSTEM USING BIPOLAR-PATTERN CENTER ESTIMATOR

[75] Inventors: Hee Wong, San Jose; Jesus Guinea, Santa Clara, both of Calif.

[73] Assignee: National Semiconductor Corp., Santa Clara, Calif.

[21] Appl. No.: 108,717

[22] Filed: Oct. 14, 1987

[51] Int. Cl.$^4$ .......................................... H04L 25/493
[52] U.S. Cl. ........................................ 375/20; 375/95; 329/311
[58] Field of Search ..................... 375/17, 20, 95, 110, 375/94, 113; 328/108, 118; 329/104

[56] References Cited

U.S. PATENT DOCUMENTS 4,635,277  1/1987  Blake et al. ............................ 375/20

Primary Examiner—Robert L. Griffin
Assistant Examiner—Marianne Huseman
Attorney, Agent, or Firm—Limbach, Limbach & Sutton

[57] ABSTRACT

The present invention provides a timing recovery technique for baseband-coded data sequences which applies to line codes with inband timing information embedded in periodic signal transitions, such as zero-crossings. The technique utilizes a selection of data patterns, like mark-to-mark, which have zero-crossings at the "center" of a transition from a positive to negative mark. These so-called "bipolar patterns" consist of two polar-signals of opposite polarity sharing neighborly baud intervals. Because the random nature of a data sequence gives timing information a statistical behavior, a timing recovery system recovers a timing average, the efficiency of the system being given in terms of the timing variance. According to the present invention, a low variance estimate for the bipolar-pattern-center timing signal is obtained by proper filtering.

11 Claims, 39 Drawing Sheets

Microfiche Appendix Included
(1 Microfiche, 31 Pages)

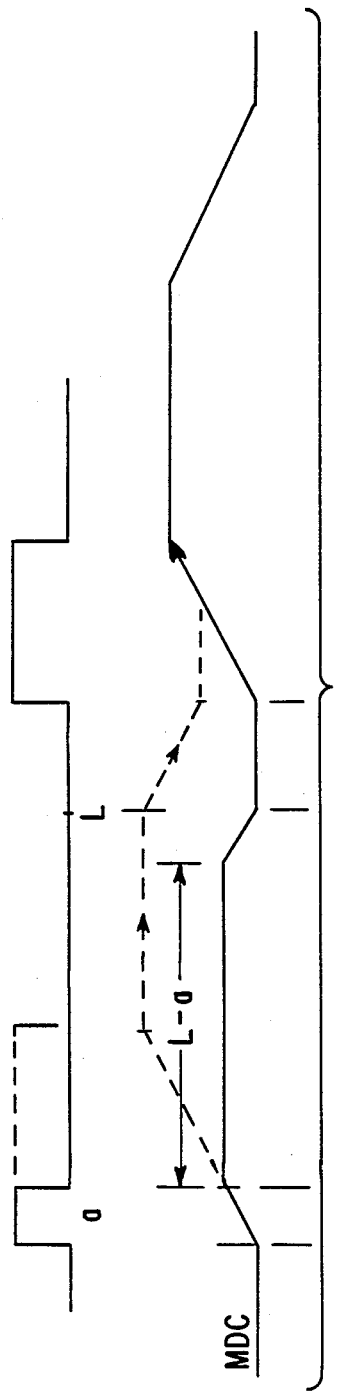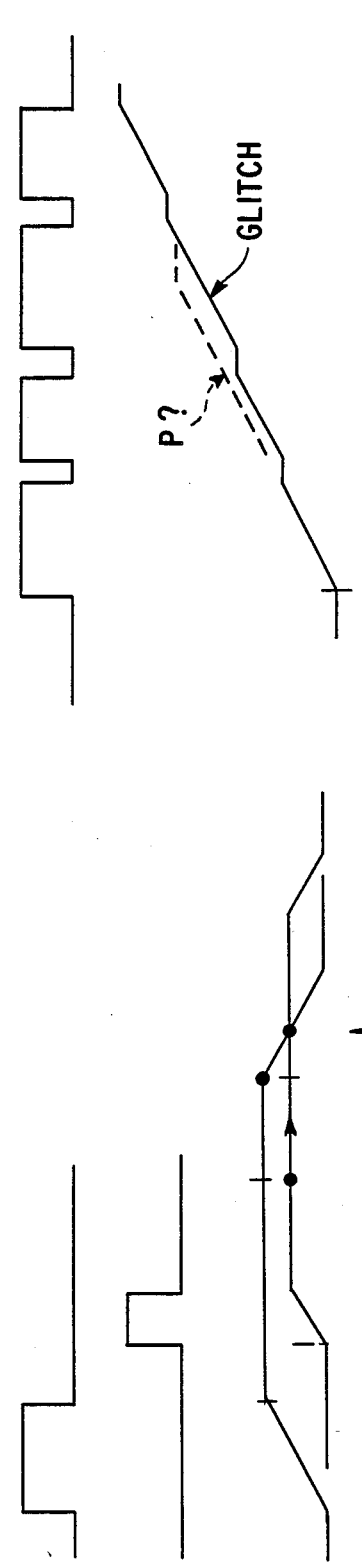

ACTIVATION/DEACTIVATION LOGIC

4,888,790

TIMING RECOVERY SYSTEM USING BIPOLAR-PATTERN CENTER ESTIMATOR

MICROFICHE APPENDIX

This application includes a Microfiche Appendix of one microfiche and 31 frames.

COPYRIGHT NOTICE

Portions of the disclosure of this patent document, in particular microfiche Appendices A–L, contain unpublished material which is subject to copyright protection. The copyright owner, National Semiconductor Corporation, has no objection to the facsimile reproduction by anyone of the patent document or the patent disclosure, as it appears in the U.S. Patent and Trademark Office patent files or records, but otherwise reserves all rights whatsoever.

BACKGROUND OF THE INVENTION

1. Field of the Invention

The present invention relates to data transmission systems and, in particular, to a bipolar-pattern center estimator circuit for retrieving timing information from a received signal.

2. Discussion of the Prior Art

A typical data receiver system is shown in FIG. 1. Prior to transmission, data is coded as a sequence of baseband pulses. While passing through the transmission channel, the data suffers systematic distortion and noise contamination. At the receiver end of the transmission system, the data is filtered to improve the signal-to-noise ratio, and then equalized. Timing information is retrieved from the transmitted pulse sequence by a timing extractor circuit which provides sampling time points for pulse detection and defines the data-symbol time boundaries. That is, each symbol occupies a time span defined by the inverse of the data rate.

The receiver efficiency strongly depends upon sampling point accuracy as well as upon the receiver's stability and noise immunity. Thus, the receiver timing-extractor in baseband systems must operate properly, independent of the received order of symbols, and provide periodic and reliable phase information to the receiving phase-locked-loop circuit.

In carrier modulated systems, the carrier generates periodic strobes as stable sources of timing. For example, usually the carrier is a "continuous wave" with regular, periodic zero-crossings.

In several baseband modulation techniques (e.g., return-to-zero (RZ), alternate-mark-inversion (AMI), partial-response coding), slicing at the zero level produces strobe signals indicating a signal transition. Some of these transitions may convey true information. Others are only due to noise and their presence produces a system impairment. Line magnitude and phase distortion and intersymbol-interference create additional impairments which result in false timing-signals. Thus, channel equalization is required to decrease the timing variance. However, channel equalization is usually implemented only with inherently associated noise enhancement.

Improvement in extracting timing information is obtained by selecting waveform points in time which are less sensitive or immune to distortion. For example, searching timing and specific data patterns is known as the index-free technique. However, index-free recovery produces nonperiodic zero-crossings that require costly band-pass filters to reconstruct the timing signal. Selected patterns display reduced interference at the point of phase-error observation.

Some of these techniques also suffer from the problem of decreasing phase-correction-rate because correction is performed statistically on selected patterns.

A compromise between intersymbol-interference and correction-rate obtained with some bipolar codes is to use a single mark-mark, the presence of which is highly probable, and then lock onto the zero-crossing at a center of a neighbor mark transition.

SUMMARY OF THE INVENTION

The present invention provides a new timing recovery technique for baseband-coded data sequences. The technique applies to line codes with inband timing information which is typically embedded in periodic signal transitions, such as zero-crossings. The technique utilizes a selection of data patterns, like mark-to-mark, which have a zero-crossing at the "center" of a transition from a positive to a negative mark. These so-called "bipolar-patterns" consist of two polar-signals of opposite polarity sharing neighboring baud intervals.

The random nature of a data sequence gives timing information a statistical behavior. Thus, a timing recovery system recovers a timing-average. The efficiency of the system is given in terms of the timing variance. A low variance estimate for the bipolar-pattern-center timing signal can be obtained by proper filtering.

A bipolar-pattern center estimator for retrieving timing information from a received signal in accordance with the present invention comprises a slicer for slicing the received signal at a first threshold level above a reference to obtain positive polar pulses and at a second threshold level below the reference to obtain negative polar pulses. The presence of a bipolar-pattern is determined by detecting adjacent pulses of opposite polarity. The center of the bipolar-pattern is then identified and utilized to construct retrieved timing information. According to a preferred embodiment of the invention, a digital transverse filter is located at the slicer output to provide window integration to detect the presence of a true data pulse. The digital transverse filter is a lossless integrator with finite memory which provides a Sinx/x transfer function whereby positive pulses and negative pulses are filtered to produce an accumulated duty-cycle measure over a time span of one baud. When the duty-cycle measure is reached, it distinguishes the presence of a true polar signal from a noisy disturbance. Adjacency of the polar pulses may be checked by registering the duty-cycle measure value of each signal polarity in two transverse filters of length L. The output of the filters then fades away within a given time constant to produce a triangular pulse for each pulse of a given polarity. The intersection of the slopes of the triangular pulses identifies bipolar-pattern presence and center.

Thus, the present invention provides robust bipolar-pattern-center detection, making timing extraction highly immune to system and pattern noise. Zero-crossing regeneration, which usually requires the use of costly bandpass filters, is eliminated. Furthermore, phase-jitter at the input of the phase-lock-loop is lowered, reducing PLL design effort and improving performance.

DESCRIPTION OF THE DRAWINGS

FIG. 6B is a timing diagram illustrating a low level-of-integration error condition.

FIG. 6C is a timing diagram illustrating a second error condition.

FIGS. 8A-1 to 8E-3 combine to provide a schematic diagram of a receiver circuit that utilizes a bipolar-pattern center estimator in accordance with the present invention.

DETAILED DESCRIPTION OF THE INVENTION

Figure 3:
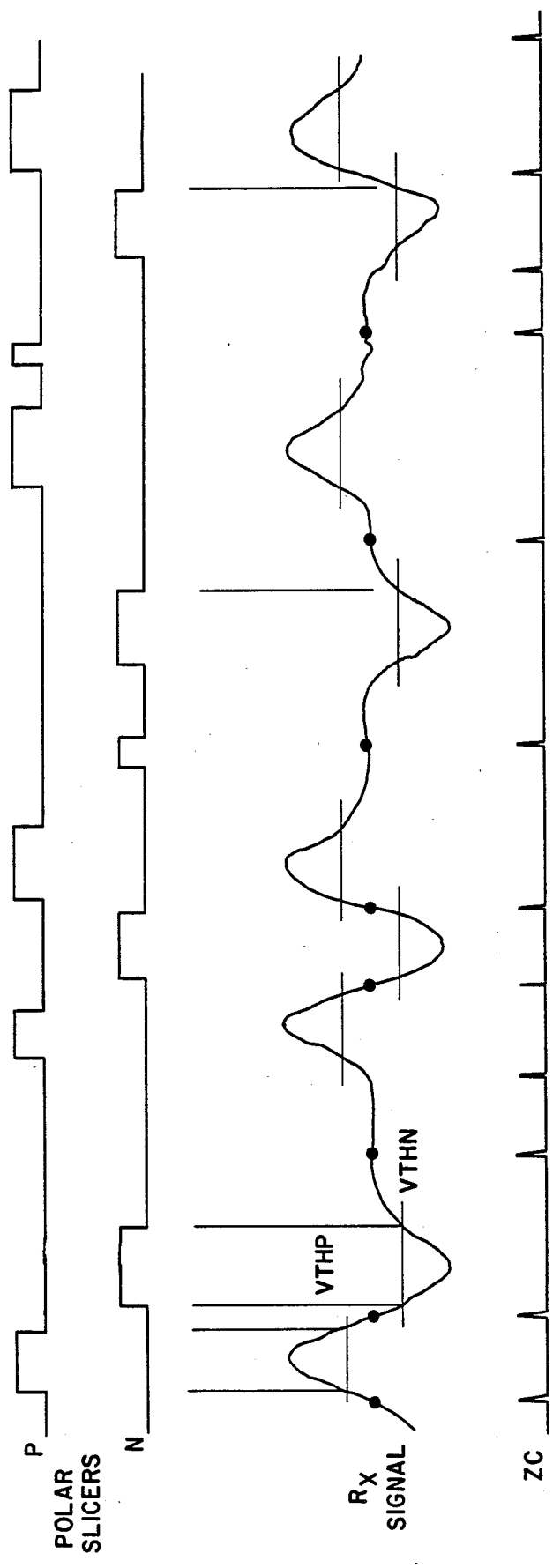
FIG. 3 is a timing diagram illustrating detection of a polar signal by slicing.
Figure 4:
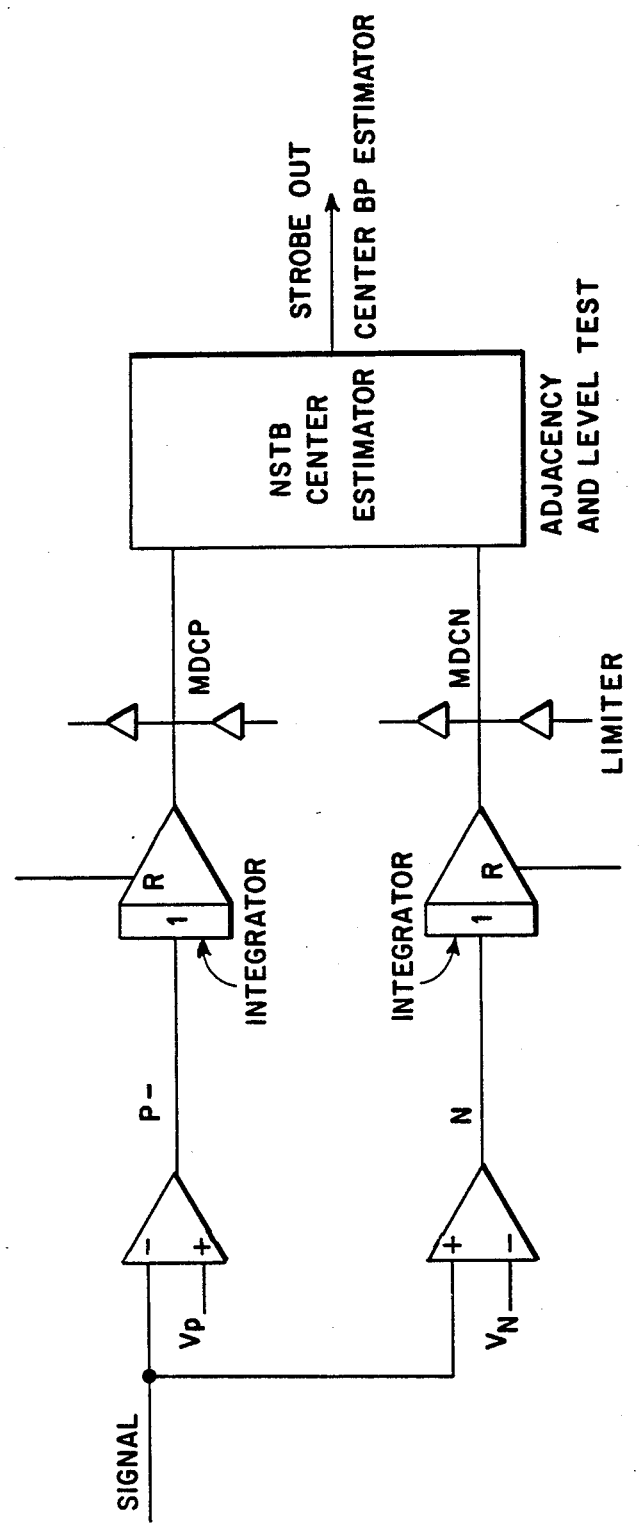
FIG. 4 is a schematic block diagram illustrating front end slicers and filters of a data receiver.

The bipolar-pattern center estimator circuit of the present invention is a "maximum-likelihooddetector" which first detects a polar-signal by slicing. That is, as shown in FIG. 3, P-pulses and N-pulses result from two slicing processes at threshold levels above and below zero to discriminate low level noise. In the following description, N-pulse and P-pulse roles can be inverted to reach the same conclusions. Signal processing, as it flows through the front-end slicers and filters, is generally illustrated in FIG. 4.

Timing detection in a noiseless case uses a slicer that translates the signal to asynchronous binary pulses with a certain duty cycle within a baud period. For noisy channels, spurious pulses may appear interleaved with the P-pulse and N-pulse signals and some filtering must be provided. Noise pre-filtering does not help in cases where dominate perturbations come from crosstalk which shares the same band as the signal of interest. Digital filtering, applied in accordance with the present invention at the slicer's output, effectively removes noise pulses, resulting in noise rejection without losing bandwidth or signal-to-noise ratio.

Noise immunity in data timing recovery is a parameter that takes precedence over accuracy due to the noisy and dispersive characteristics of typical data transmission channels. Thus, a noise-immune estimator of the type described herein will provide better performance than an accurate timing extractor which is noise sensitive.

In the estimator circuit of the present invention, a simple digital transversal filter provides window integration to detect the presence of a true data pulse. This lossless integrator with finite memory provides a Sinx/x transfer function. P-pulses and N-pulses are filtered producing an accumulated duty-cycle measure over a time span of one baud. "Accumulated-duty-cycle" is defined as the ratio of accumulated time a signal has above the slicer level to the total baud period, for example, 50% indicates that a signal has been above the detection level for half baud without regard to how many times it crosses the detection threshold. When the integrator's duty-cycle measure value is reached, it distinguishes the presence of a true polar signal from noisy disturbances.

Based on these considerations, two parameters regarding a polar-pulse are generated by the front-end slice/filter circuit of the present invention. The first is the duty-cycle measure value DCM. The second is the integrator output wave shape, which is a measure of the distribution pulses within a baud.

The presence of a bipolar-pattern is determined by detection of two opposite consecutive polar signals, i.e. two adjacent marks in AMI coding. The adjacency is checked by registering the duty-cycle-measure value of each signal polarity in two transversal filters of length L, the output of which then fades away within a given time constant producing a triangular pulse for each received mark of a given polarity. Nonadjacent marks create triangular pulses with slopes that do not intersect in time and the filter output returns to zero level. If the two slopes intersect in the noise free case, the time-point of intersection estimates accurately the bipolar-pattern presence and center.

Figure 5:
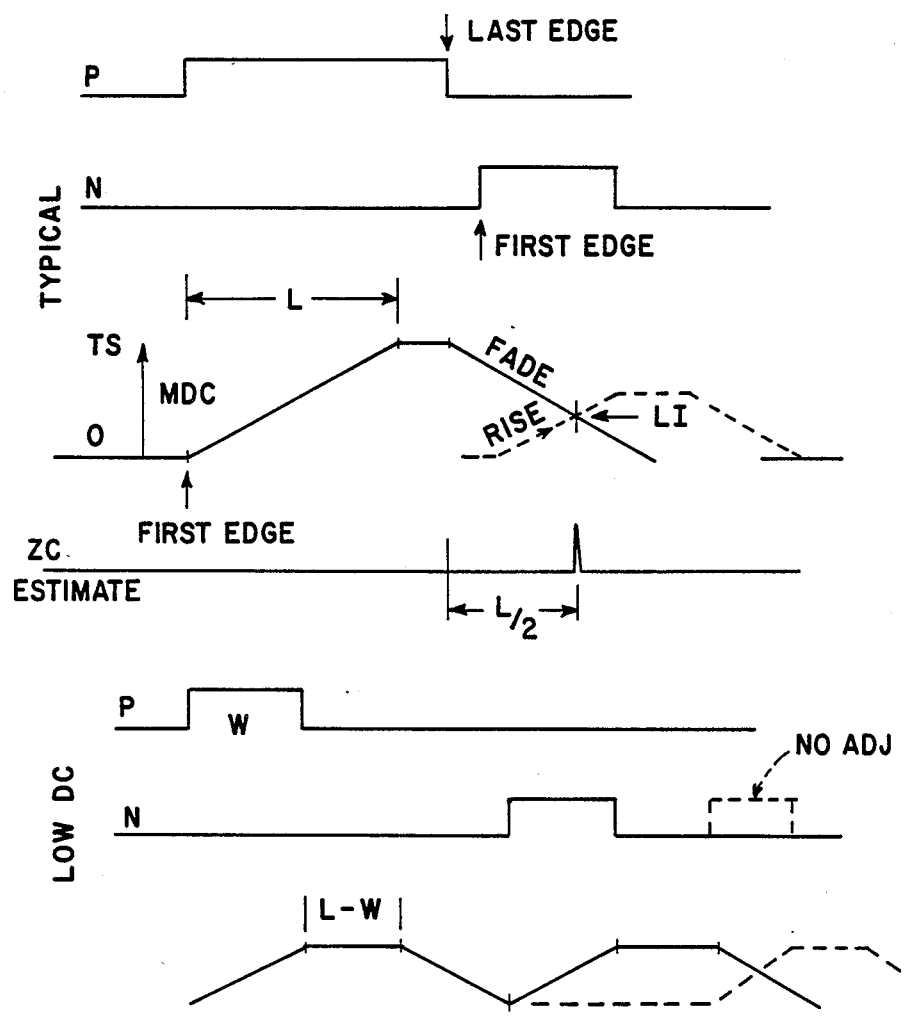
FIG. 5 is a timing diagram illustrating the proper conditions for polar presence and adjacency.

The time constant of integration in the filters is obtained from the sampling clock and is much higher than the baud-rate. Integration-up is determined by a signal exceeding the threshold and is a straight line for well-behaved pulses, and saturates when reaching the maximum integrator level, as shown in FIG. 5.

Each polarity filter "integrates up" to the duty cycle measure value and holds the value for L−w, where w is the accumulated-pulse-width, as a response of a signal and then fades towards zero in a reverse order of the steps used in the integration up period.

The hold time L−w means that narrow pulses are ignored, or filtered out, and do not effect the reached duty-cycle-measure value. If the pulse is larger than L, then the output saturates to a maximum duty cycle measure value MDCM and stays for w−L units before integration down starts at the last edge of the current pulse or pulses thereof. The integrator's output is triangular or trapezoidal when saturation is reached. The output waveshape base width is fixed to 2L.

For noise pulses, the threshold tends to be crossed many times and sections of the integration are interrupted by constant-valued horizontal levels.

Figure 7:
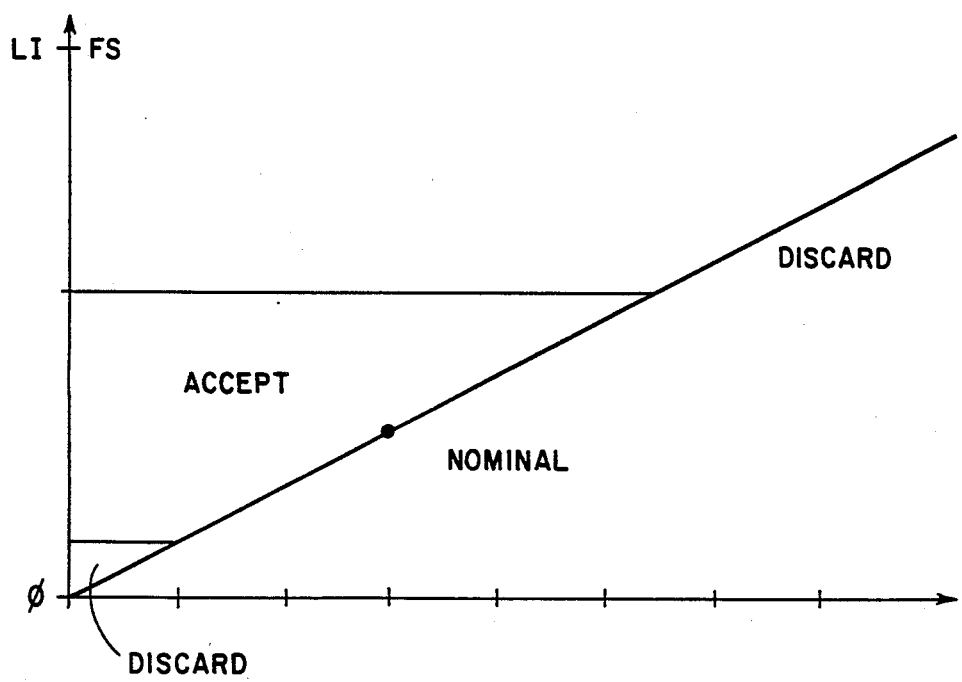
FIG. 7 is a graph illustrating "adjacency" versus "level-of-integration".

Integration-up and integration-down slopes cross at a "level-of-intersection" LI the value of which defines the proper conditions for polar-presence and "adjacency", as shown in FIG. 7. An isolated pulse arrives when the previous duty-cycle-measure value has faded out completely and no bipolar pattern presence is generated.

Extreme values of level-of-intersection LI indicate an erroneous condition. Low level-of-intersection values may indicate low duty-cycle in either polar detection, which can be produced by noise. High level-of-intersection values may also indicate unreliable pulses received.

Figure 6A:
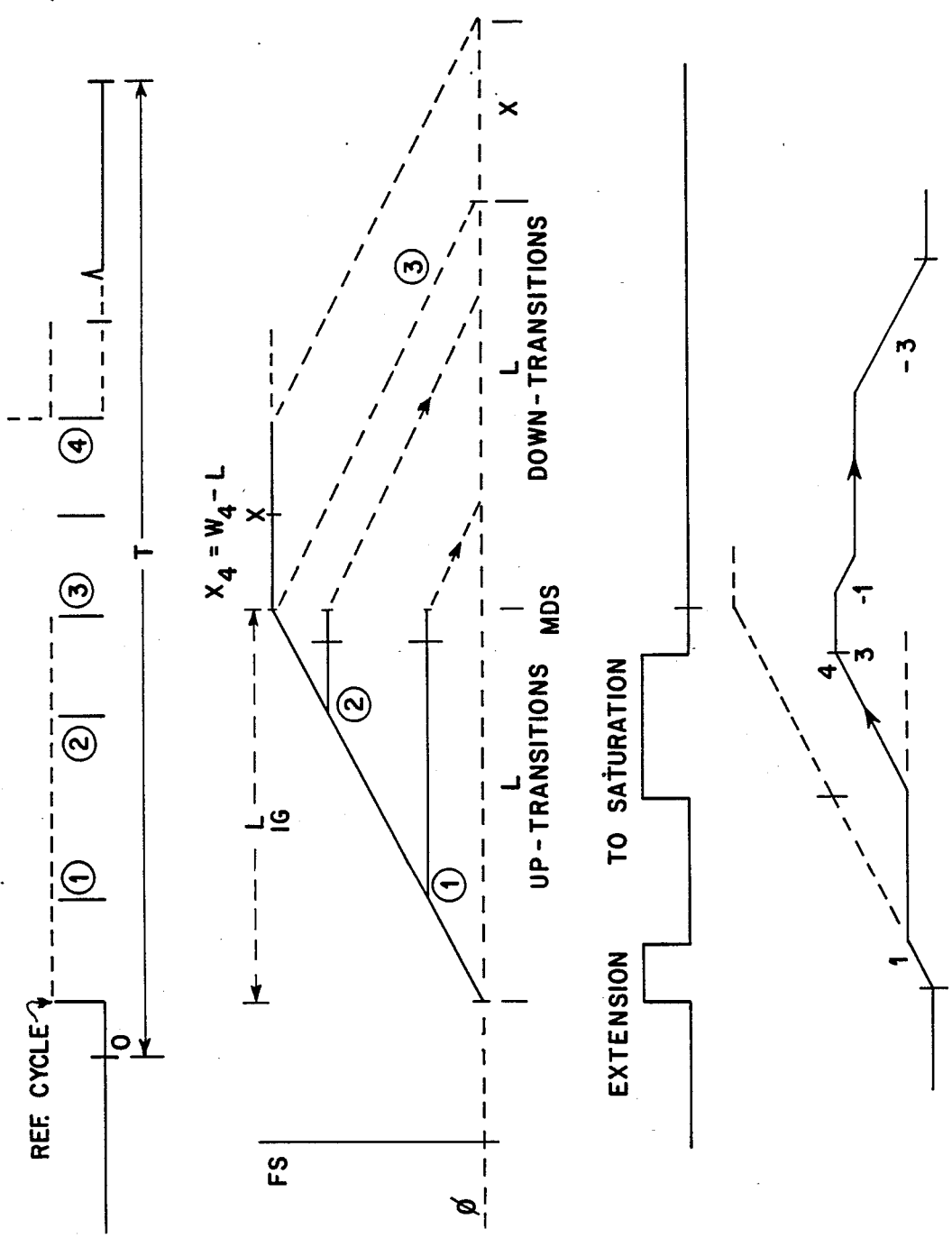
FIG. 6A is a timing diagram illustrating filter output for different duty cycles.

Possible slope intersections may occur in the case of close "opposite slopes", in the case when one slope is horizontal while moving in the opposite direction to the other, or in the case when one slope is horizontal moving in the same direction. FIG. 6A shows the filter's output for different duty cycles. Error situations are illustrated by the plots in FIGS. 6B and 6C. These erroneous situations have been shown to be rare enough not to cause any problems, even for very low signal-to-noise ratios (0dB).

The integrator's outputs slopes create a strobe at their crossing point.

The strobe timing has a fixed phase relation to the true zero-crossing given by half the filter delay length.

Strobe generation by center estimation is highly insensitive to noise and reduces the effect of pattern noise intersymbol interference on timing error.

System operation relies on several nonlinear processes over the received signal. To simplify implementation, a digital approach is used.

FIGS. 8A-1 to 8E-3 combine to provide a detailed circuit schematic of a receiver circuit that utilizes a bipolar-pattern center estimator in accordance with the present invention.

Figure 1:
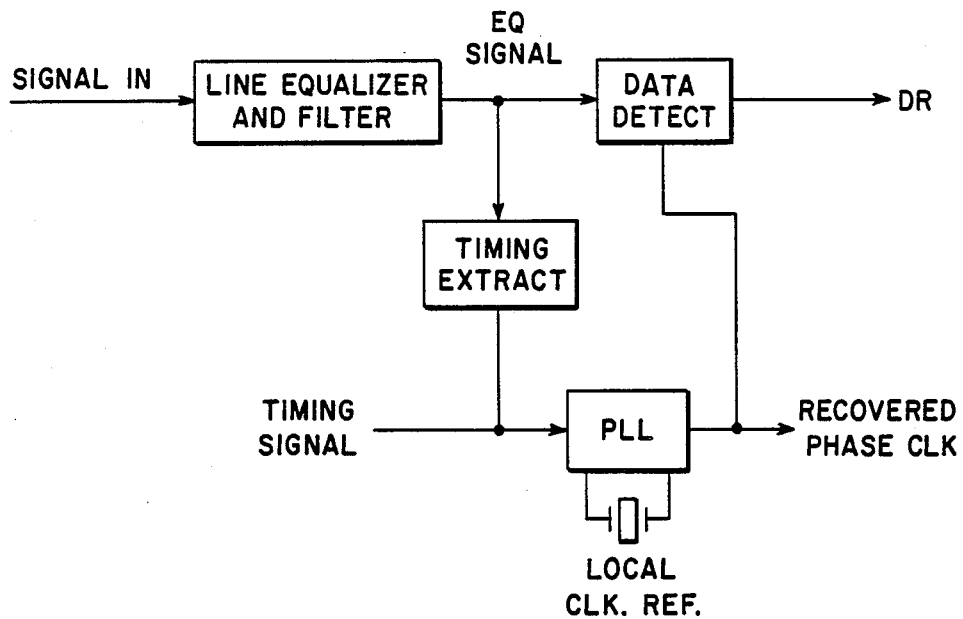
FIG. 1 is a schematic block diagram illustrating a conventional data receiver.
Figures 1, 8A:
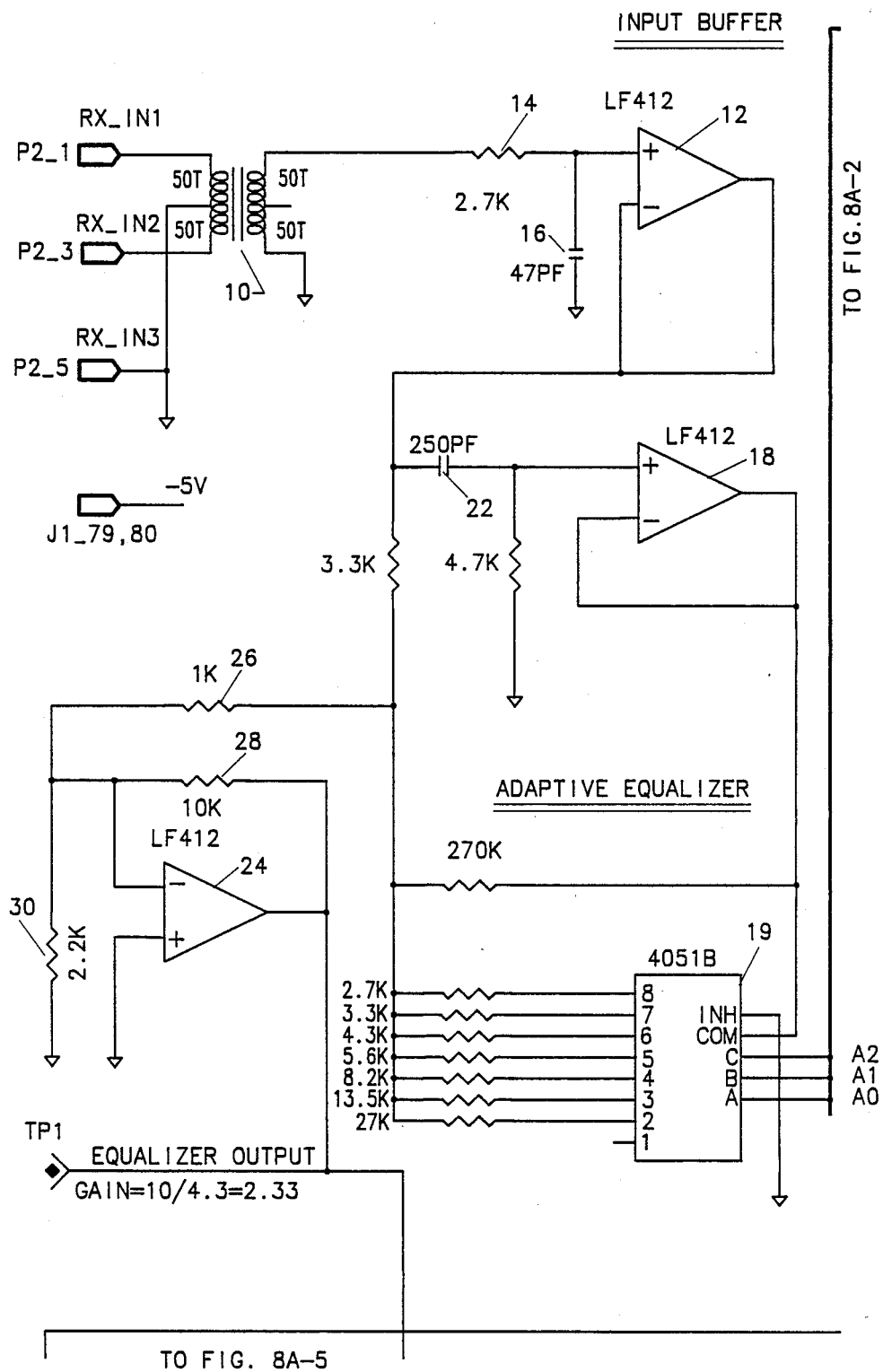
Figures 2, 8A:
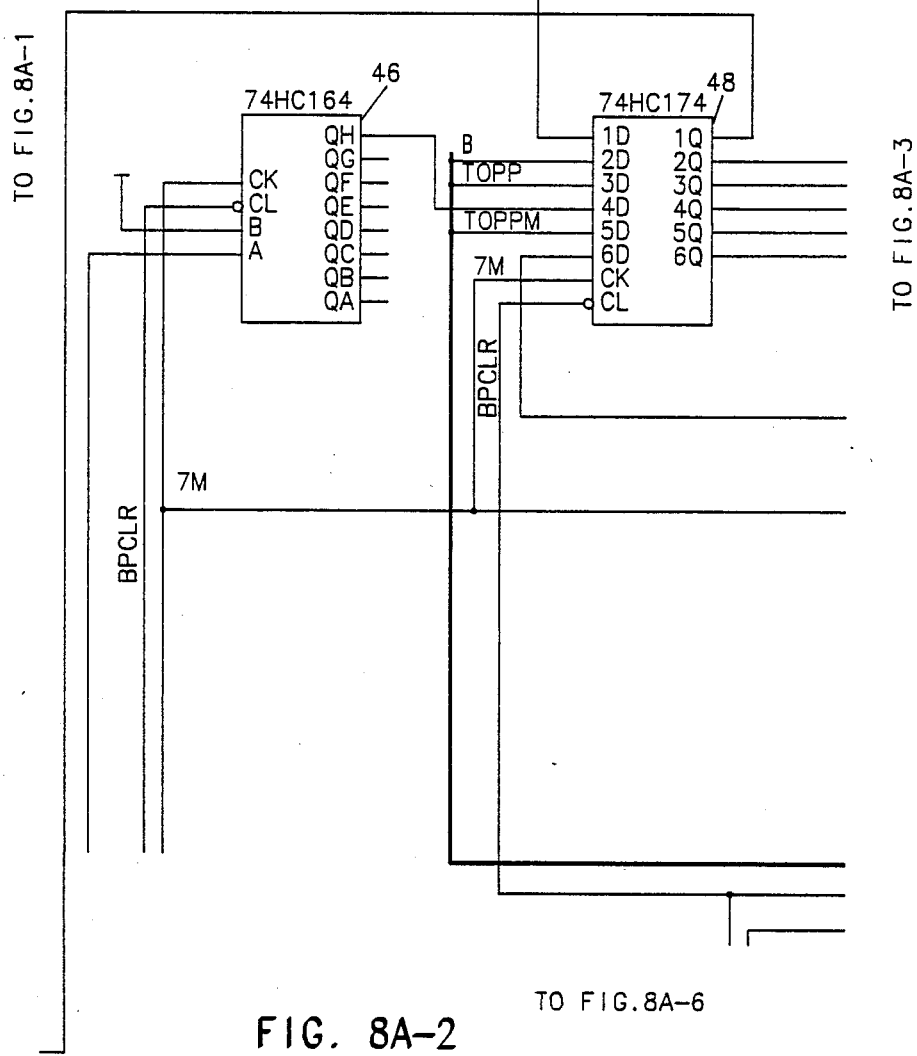
Figures 3, 8A:
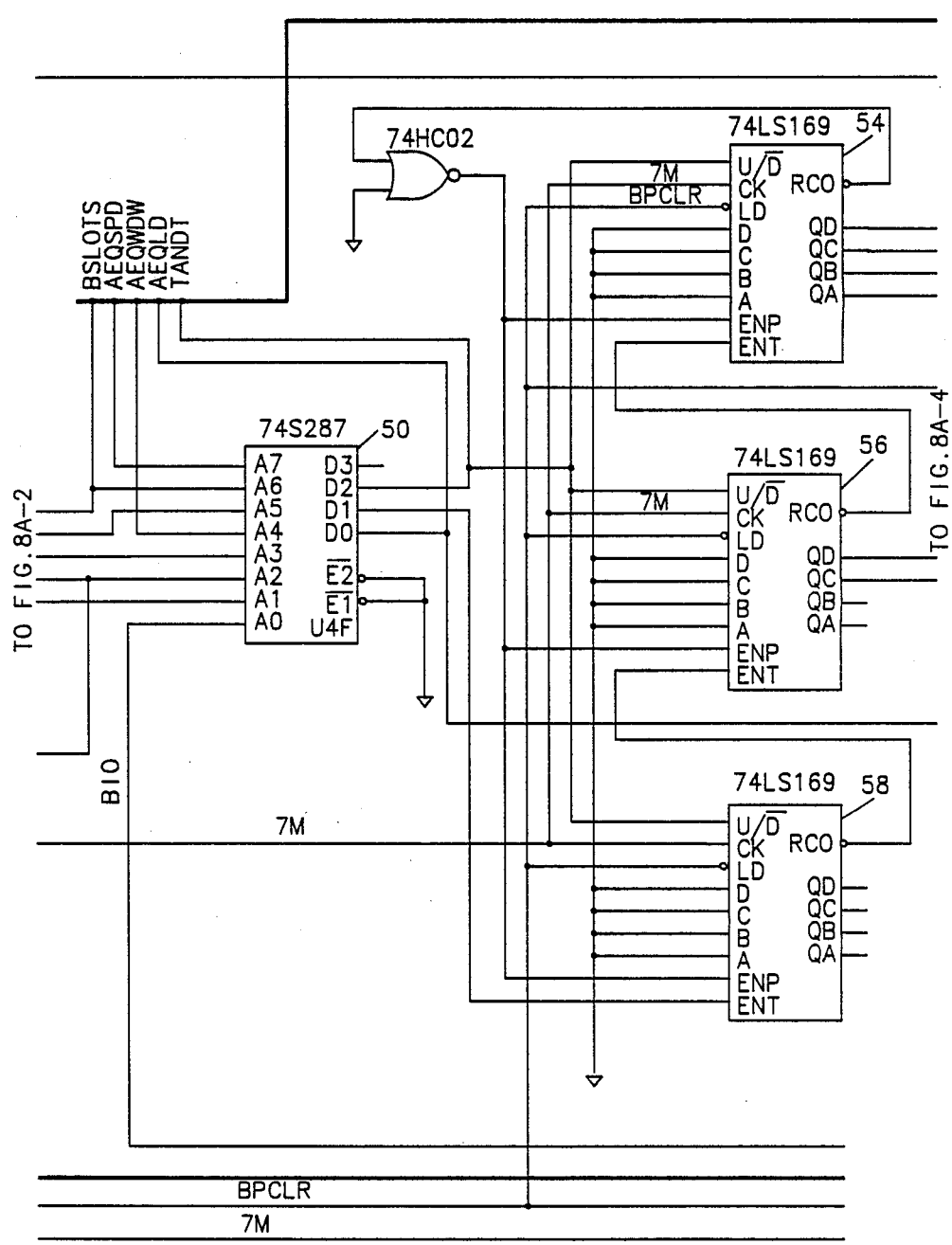
Figures 4, 8A:
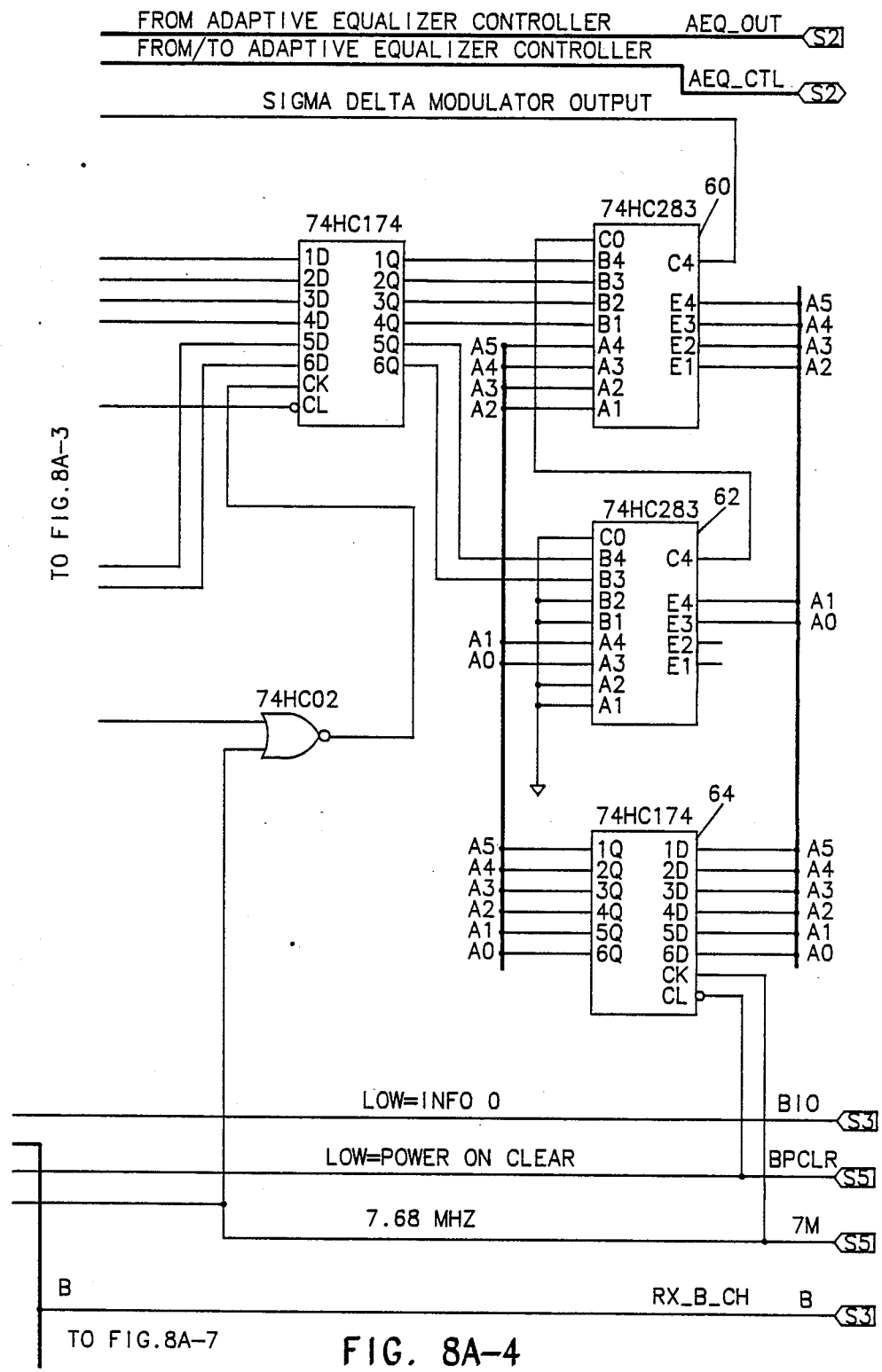
Figures 5, 8A:
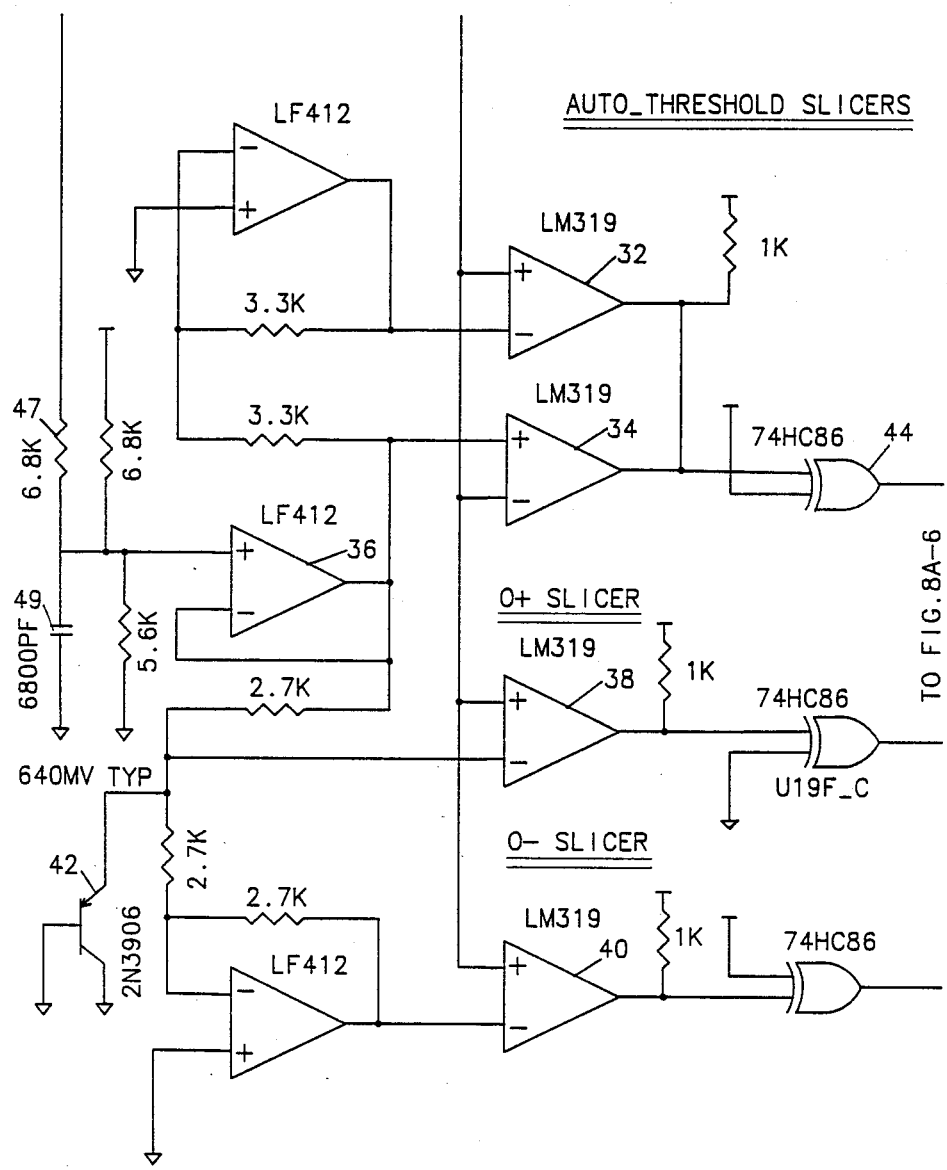

As shown in FIG. 8A-1, the circuit includes a front-end and adaptive equalizer which includes an input transformer 10 with a 1:1 ratio to prevent overloading of the buffers and the equalizer. The output of the transformer 10 is provided as one of the inputs to a unity gain buffer and low-pass filter consisting of buffer 12, 2.7K resistor 14 and 47 pF capacitor 16 and having a −3 dB roll-off at a frequency of 1.25 MHz. The output of the unity gain buffer 12 is provided to a line equalization high-pass filter which consists of buffer 18 and an input RC consisting of 4.7K resistor 20 and 250 pF capacitor 22. The high-pass filter has a −3 dB roll-off at a frequency of 135 KHz. An amplifier 24, together with 1K resistor 26, 10K resistor 28 and 2.2K resistor 30, combine to form an inverting summing amplifier which generates the equalizer output with a gain of 2.33. The amount of equalization is controlled by binary code at pins C (msb), B and A of component 19 and its seven associated resistors. Thus, there are eight possible steps, with a "0" binary code equalling a flat response.

The equalizer output signal from component 24 is provided to a group of input slicers and level translators (see FIG. 8A-5). Components 32 and 34, together with an auto-threshold controller, which is described in detail below, form a full-wave peak-voltage tracking loop. The voltage reading $V_{ath}+$ at the positive input of component 34 is a measure of the peak voltage of the equalizer output, i.e., 0.5 volts denotes the output amplitude =0.5V peak or 1V peak-to-peak. If the output amplitude is below 0.22 or above 2.33V, then $V_{ath}+$ will be limited to 0.22 or 2.33V, respectively. This is accomplished by the resistor "T" network at the positive input of component 36.

If voltage $V_{ath}+$ is normalized to 1, then the voltage Vath− at the negative input of auto-threshold 0− comparator 32 is −1V, the voltage VO+ at the negative input of 0+ signal-detection slicer 38 is 0.5V, and the voltage VO− at the negative input of 0-signal detection slicer 40 is −0.5.

If voltage $V_{ath}+$ exceeds 1280 mv, then VO+ and VO− are clamped to 640 millivolts and −640 millivolts, respectively. The clamping function is necessary when the circuit operates in the network terminating NT mode with multiple-terminal nodes TE connected to the bus. Otherwise the nearby TEs would drive the VO+ or the VO− threshold levels above the received signal peaks from the remote TEs, causing detection errors.

The PNP transistor 42 connected to the negative input pin of component 38 provides the clamping function.

A cross-reference table showing the relationship between the voltage levels is provided in Table 1.

TABLE 1

| X' Former Secondary | $E_q$ O/P | $V_{ath+}$ | VO+ |
|---|---|---|---|
| 1 $V_{peak}$ (+2.5 dB) | 2.33 $V_{peak}$ | 2.33 V | 0.64 V |
| 0.89 $V_{peak}$ (+1.5 dB) | 2.07 $V_{peak}$ | 2.07 V | 0.64 V |
| 0.75 $V_{peak}$ (0 dB) | 1.74 $V_{peak}$ | 1.74 V | 0.64 V |
| 0.55 $V_{peak}$ (−2.7 dB) | 1.28 $V_{peak}$ | 1.28 V | 0.64 V |
| 0.50 $V_{peak}$ (−3.5 dB) | 1.17 $V_{peak}$ | 1.17 V | 0.58 V |
| 0.32 $V_{peak}$ (−7.5 db) | 0.74 $V_{peak}$ | 0.74 V | 0.37 V |
| 0.09 $V_{peak}$ (−18.0 dB) | 0.22 $V_{peak}$ | 0.22 V | 0.11 V |
| 0 $V_{peak}$ | 0 $V_{peak}$ | 0.22 V | 0.11 V |

Note: $V_{ath-} = -V_{ath+}$, VO− = −VO+

The output of auto-threshold comparators 32 and 34 is provided to an auto-threshold controller. More specifically, the output of auto-threshold comparator 34 is provided through XOR gate 44 and pipelined through components 46 and 48 (see FIG. 8A-2), its destination being auto-threshold controller ROM 50 (see FIG. 8A-3). The coding program "ATHCTL.src" for auto-threshold controller ROM 50 is provided on microfiche appendix.

The signal at pin A3 of ROM 50 is named "TOPP", and if high, shows the 0+ pulse from the equalizer is either higher than $V_{ath}+$ or the 0− pulse is lower than $V_{ath}-$ (0+ and 0− pulses are exclusive). The "TOPP" signal is used to generate the error feedback control for the loop. Under normal operation, the control loop will "track out" the voltage differences causing "TOPP" to bounce between 0V and 5V.

There are three qualifiers connected to auto-threshold controller ROM 50. The first qualifier is provided by center estimating ROM 52 (see FIG. 8A-7) and is the sliced output from the 0+ and 0− filters. This signal, named "TOPPM", if high, indicates that the "TOPP" output is due to a "healthy" pulse, i.e., one not caused by noise. The TOPPM signal also indicates when the input signal has no modulation, i.e., binary 1°s imbedded in the input stream. In this case, $V_{ath}+$, as well as $V_{ath}-$, retain the previous value during the binary 1's period, resulting in less ripple in the control voltage.

The second qualifier input to ROM 50 is provided by the adaptive equalizer and is identified as "AEQWDW". This qualifier allows the auto-threshold circuit to operate on the same input signal segments as the adaptive equalizer.

The third input to ROM 50 is from the frame synchronizer/lock detector, to be described below, and is identified as "BSLOTS". This signal enables the auto-threshold circuit from the second "B" bit to the bit after the last "B" bit in the B1 and B2 channels. The function of the BSLOTS input is to prevent the auto-threshold circuit from responding to other bits which may contain distortion due to bus contention.

The signal "AEQSPD", applied to pin A7 of ROM 50, is derived from the frame synchronizer/lock detector, which is set high after frame-in-lock plus eight additional frames, is used to enable/disable the qualifiers. When "AEQSPD" is set low, the "TOPP" output is qualified with "TOPPM" only, so that $V_{ath}+$ or $V_{ath}-$ ramps up at maximum speed. After signal "ASQSPD" is set high, "TOPP" is qualified with "TOPPM", "AEQWDW" and "BSLOTS", so that the activities of the auto-threshold circuit are limited to a fraction of a bit period within the B channels for rejecting unwanted input imperfections.

Components 54, 56 and 58 (see FIG. 8A-3) form an error integrator for the control loop. The error integrator, up/down controlled by the "TOPP" signal, is enabled during the period defined by the qualifiers. During the window openings, the integrator counters either count up if the input signal is less than $V_{ath}+$ or count down if the input signal is more than $V_{ath}+$. The opposite is true for $V_{ath}-$.

The signal TOPP, which is applied at pin D3 of ROM 50 and derived from the center estimating ROM 52, is the sliced 0+ filter output. This signal is similar to "TOPPM" except that there is no output for the 0− input pulses. During the rising edge of the "TOPP" signal, the integrator's output is transferred to a Sigma/Delta modulator described below.

The Sigma/Delta modulator, consisting of components 60, 62 and 64 (see FIG. 8A-4), converts the binary output from the integrators 54, 56, 58 to a 1 bit pulse density modulated PDM signal having a 7.68 MHz sampling frequency. The modulator is functionally equivalent to a conventional 6 bit digital-to-analog converter (DAC). The output of the modulator is available at the "carry" pin, i.e. pin C4, of adder circuit 60. The output is then pipelined through component 48 and converted into a DC control voltage after the RC "T" network, consisting of 6.8K resistor 47 and 6800 pF capacitor 49, connected at pin 1Q of component 48. The RC time constant is set at 20 microseconds, which is about 4 bit periods.

Signal BIO, which is derived from Info Decoders, to be described below, goes low when the input equals INFO 0. If INFO 0 is detected, then $V_{ath}+$ (the same for $V_{ath}-$, but opposite direction) is ramped down towards the minimum voltage level, i.e., the highest sensitivity.

Figures 6, 8A:
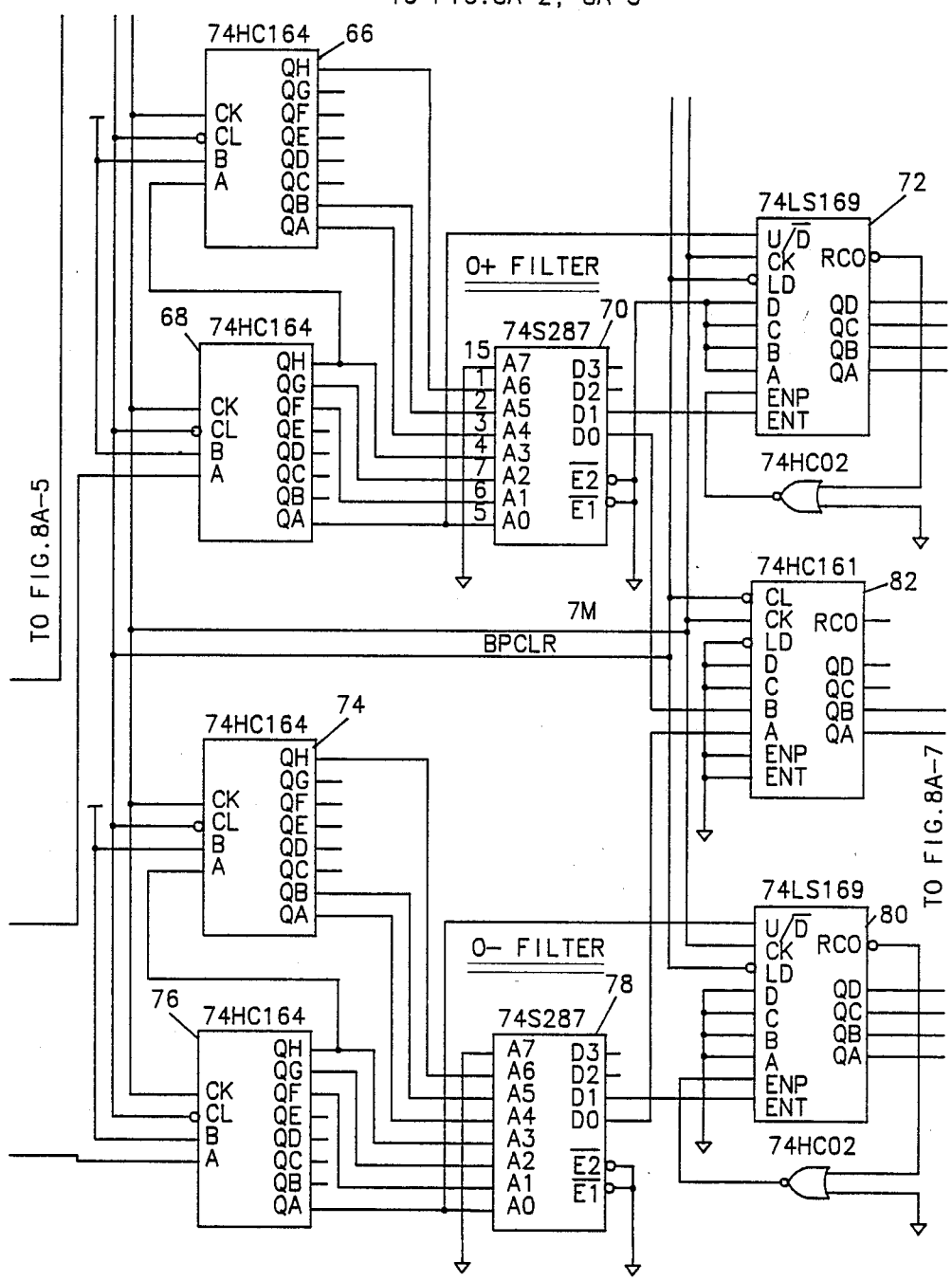
Figures 7, 8A:
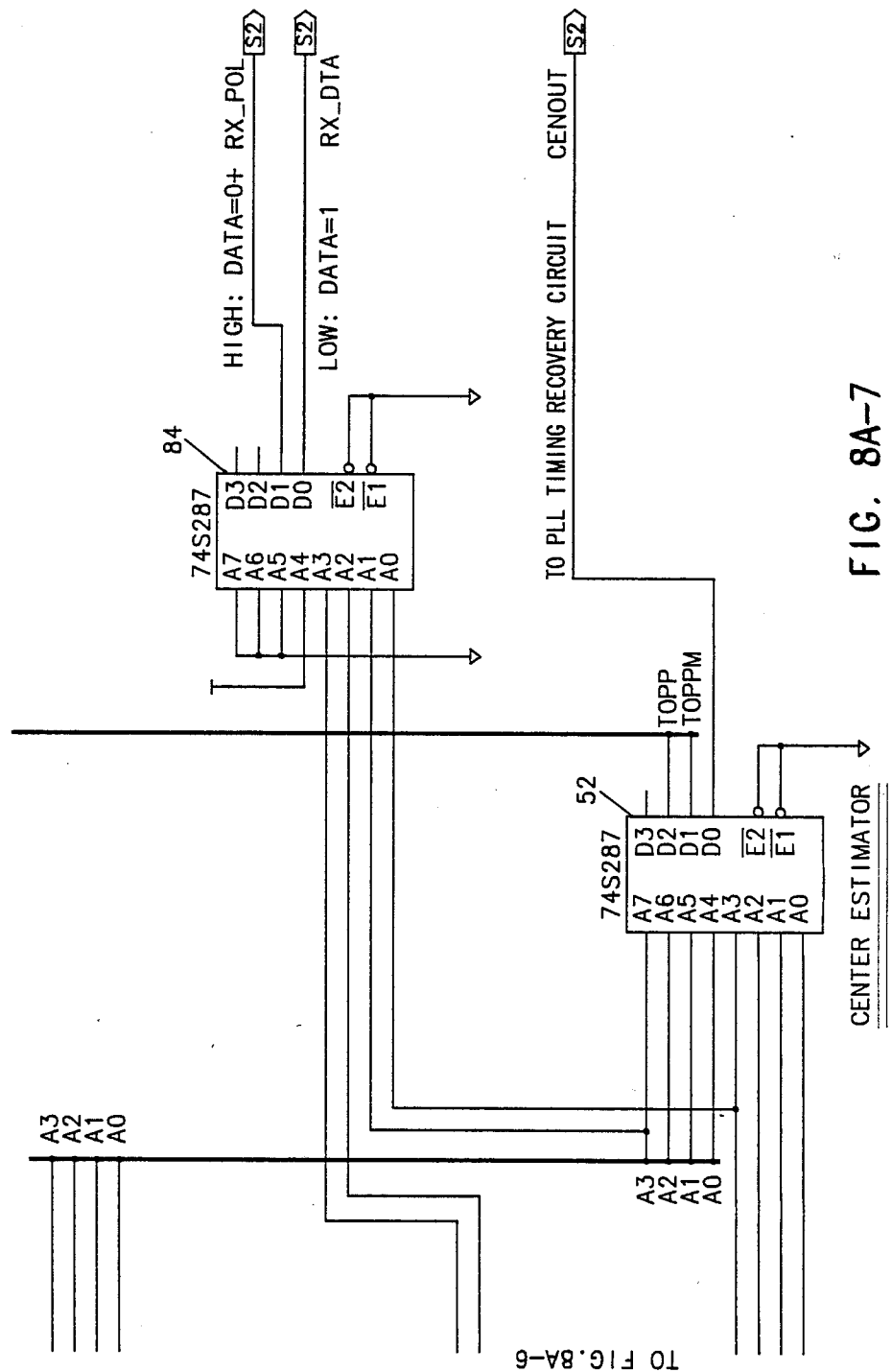

As shown in FIG. 8A-6, the 0+ filter block, consisting of components 66, 68, 70 and 72, and the 0− filter block, consisting of components 74, 76, 78 and 80, are identical. Each filter block consists of two 1-bit wide moving average filters (5 and 15 sampling points), so there are four filters. The filter algorithm sums the numbers of 1's and 0's within the specified window period. If the number of 1's is greater than the number of 0's, then the filter outputs a "1". If the opposite is true, then the filter outputs a "0". Details of the coding algorithm "FTF" are provided on microfiche appendix. The implementation of the 15-point filters is slightly different from the 5-point filters, in that the 15-point filters utilize counters instead of direct decoding for cost purposes.

The 5-point filters are utilized for signal-detection, i.e. demodulation, purposes. The 0+ filter output is available at pin D0 of component 70, while the 0− output is available at pin D0 of component 78. These two outputs, after being pipelined through components 82, are provided to PROM 84. PROM 84 also receives inputs from the 15-point outputs of filters 72 and 80. The select pin, i.e., pin A4 of PROM 84, selects either the 5-point pair or the 15-point pair to the outputs of PROM 84. In this embodiment, the select input is connected to $V_{CC}$ such that the 5-point filter outputs are always selected. The "RX-POL" output from PROM 84 is identical to the 5-point filter plus filter output: if high, input=0+; if low, input=0−. The RX-DATA output is the logical "OR" of the 5-point 0+ and 0-filter outputs: if high, input equals 0+ or 0−; if low, input equal binary 1. The coding program "FASEL" for PROM 84 is provided on microfiche appendix.

The 15-point filters serve as the front-end circuitry for the center-estimator described below. The "TOPP" and the "TOPPM" signals connected to the auto-thresholder section described above are derived from the 0+ and the 0− filters: if the number of 1's is ≧12 within a 15-point window, then the output is set to 1.

As described above, a front-end set of comparators slice the signal at thresholds determined by a peak detector circuit, typically at one-half of the received signal peak. The system is sampled at a rate $f_s$, typically many times the line-rate $f_b$. Asynchronous polar pulses P and N are fed with proper phase to the filter circuits using shift registers 66, 68 and 74, 76, respectively. Integration is performed by up-down counters 72 and 80 which are connected in a top/bottom self-stop mode. Circuits 70 and 78 produce integrator control signals based in pulse presence for a time span given by the register length. Center estimator ROM 52 contains discrimination logic plus detector circuitry. State transition is, provided by the FASEL program listing provided on microfiche appendix.

Figures 1, 8B:
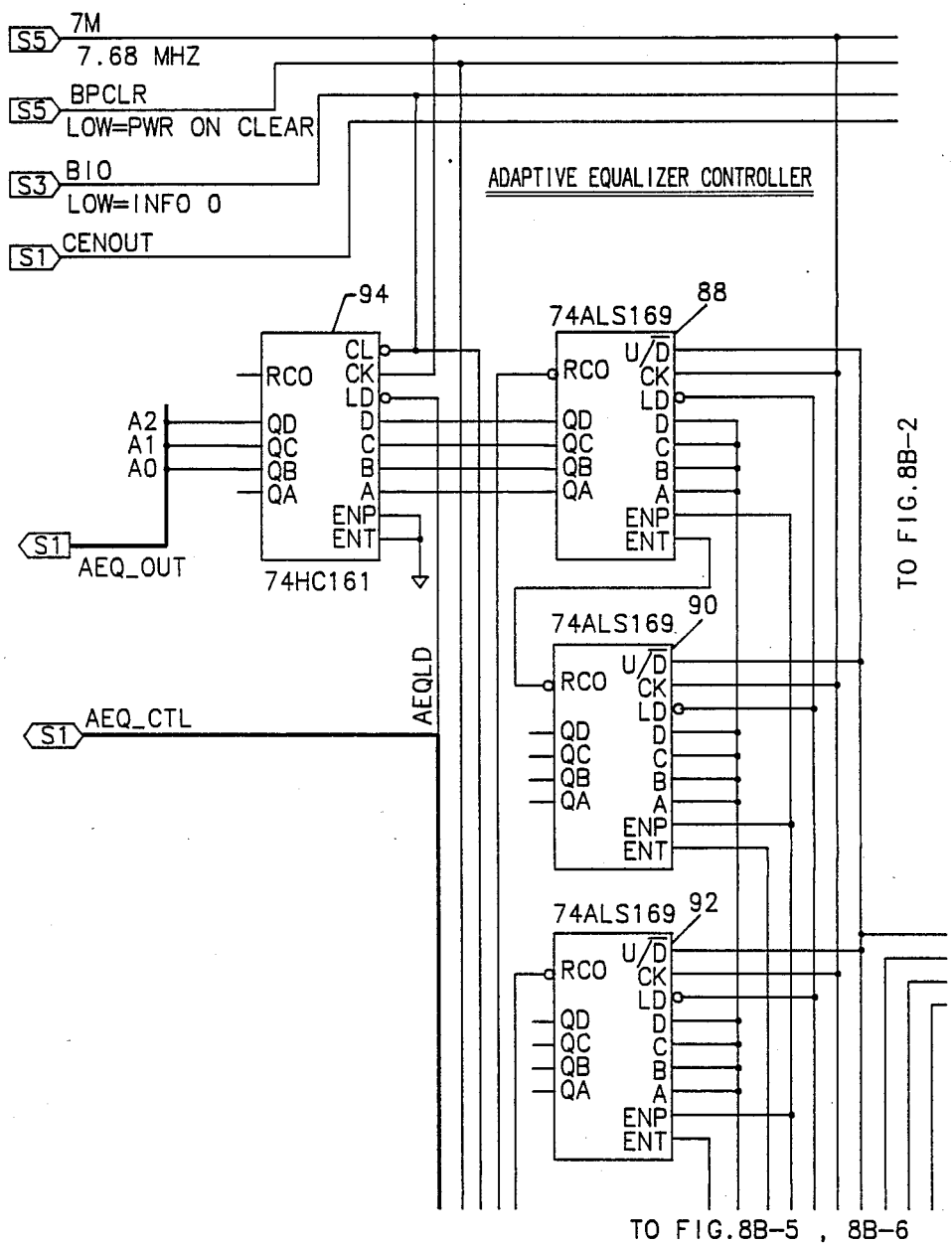
Figures 2, 8B:
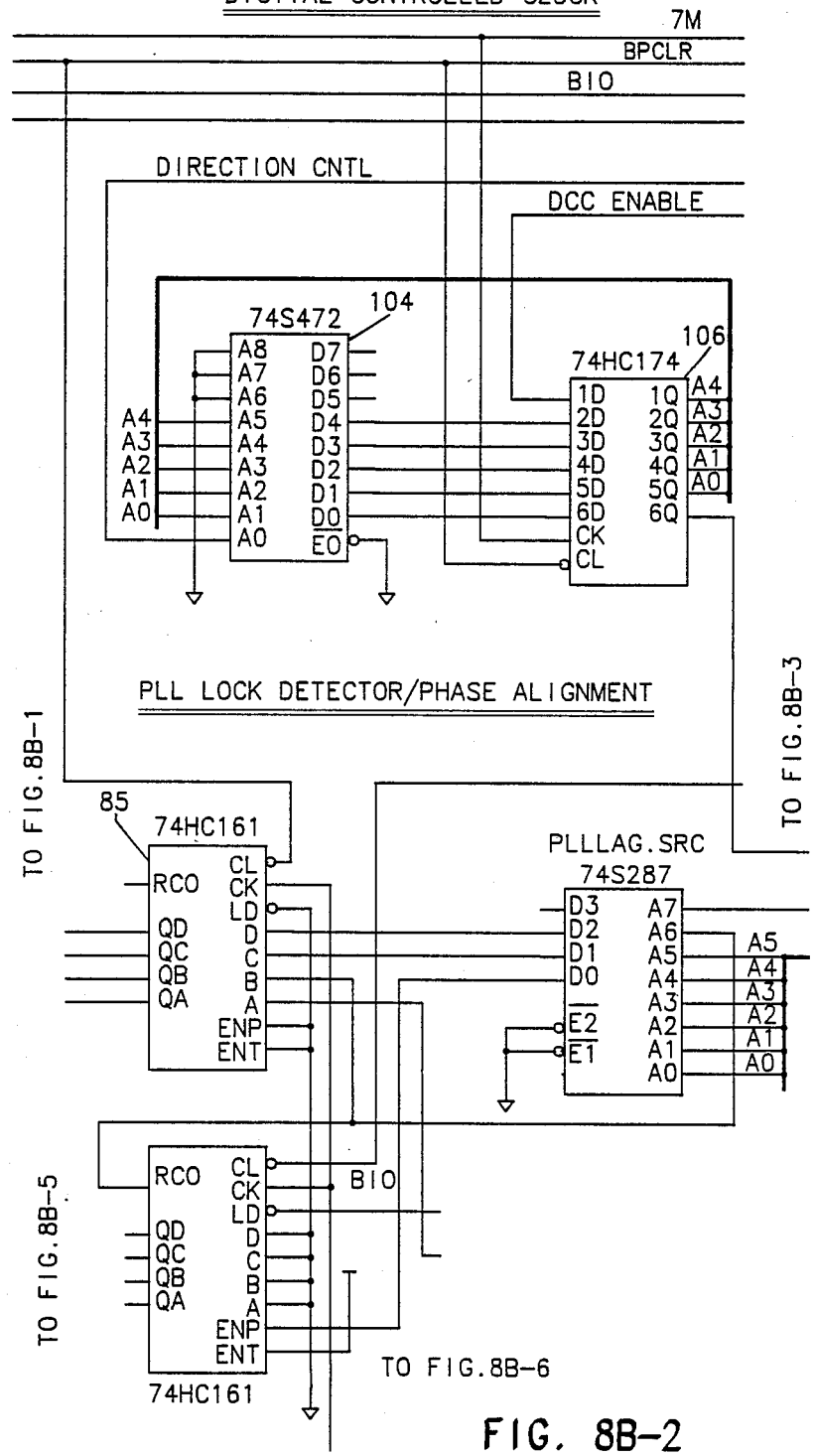
Figures 3, 8B:
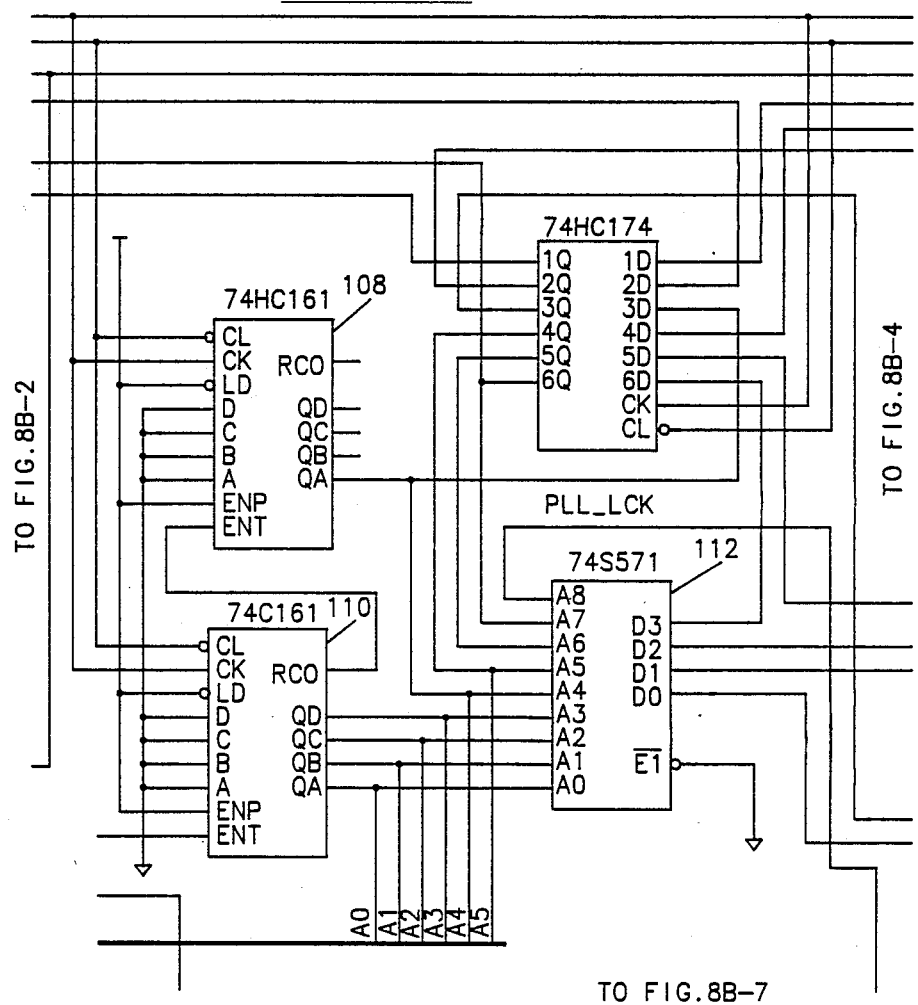
Figures 4, 8B:
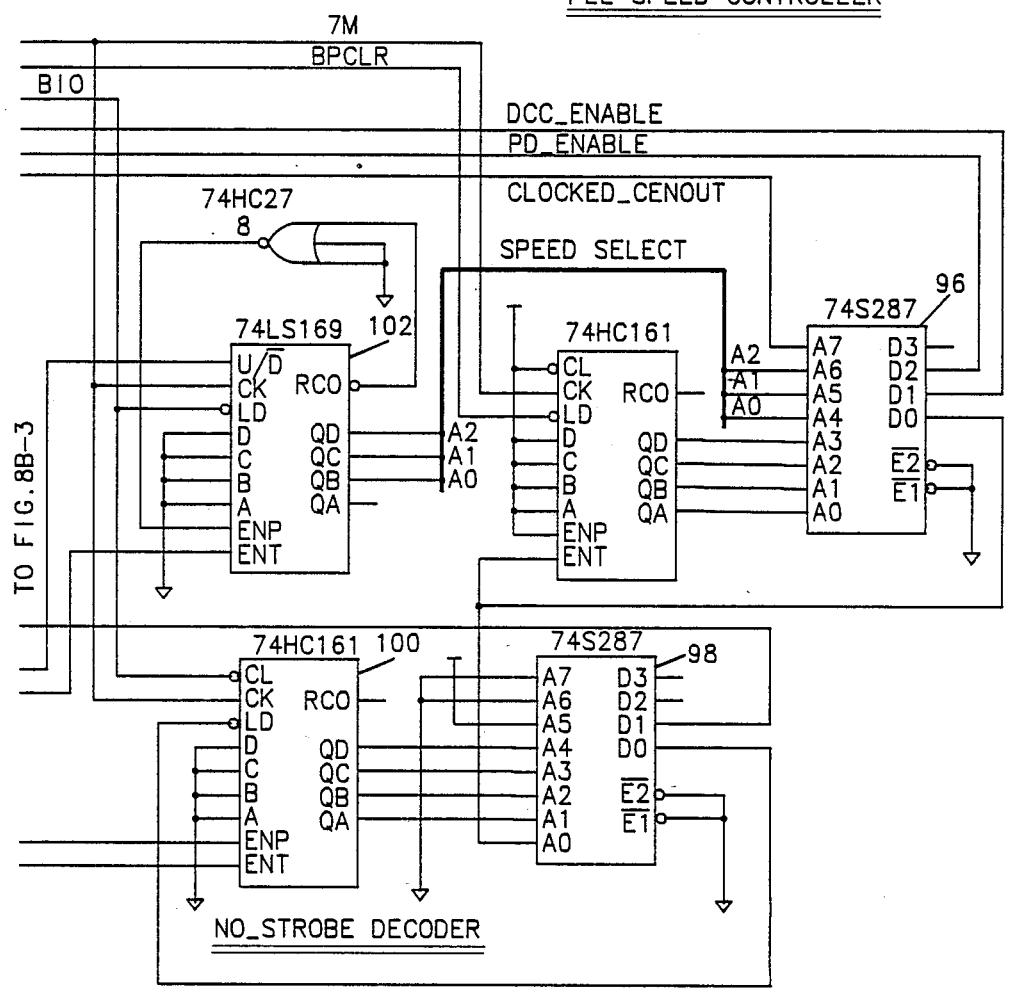
Figures 5, 8B:
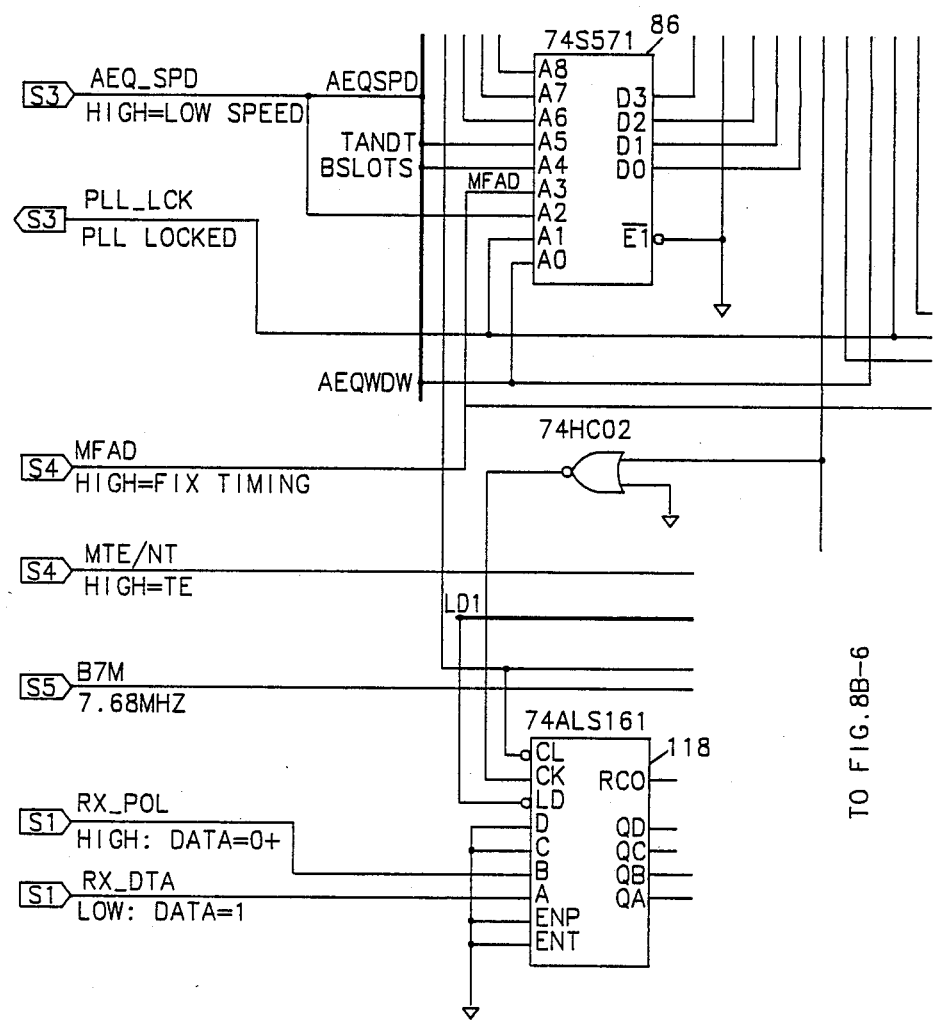
Figures 6, 8B:
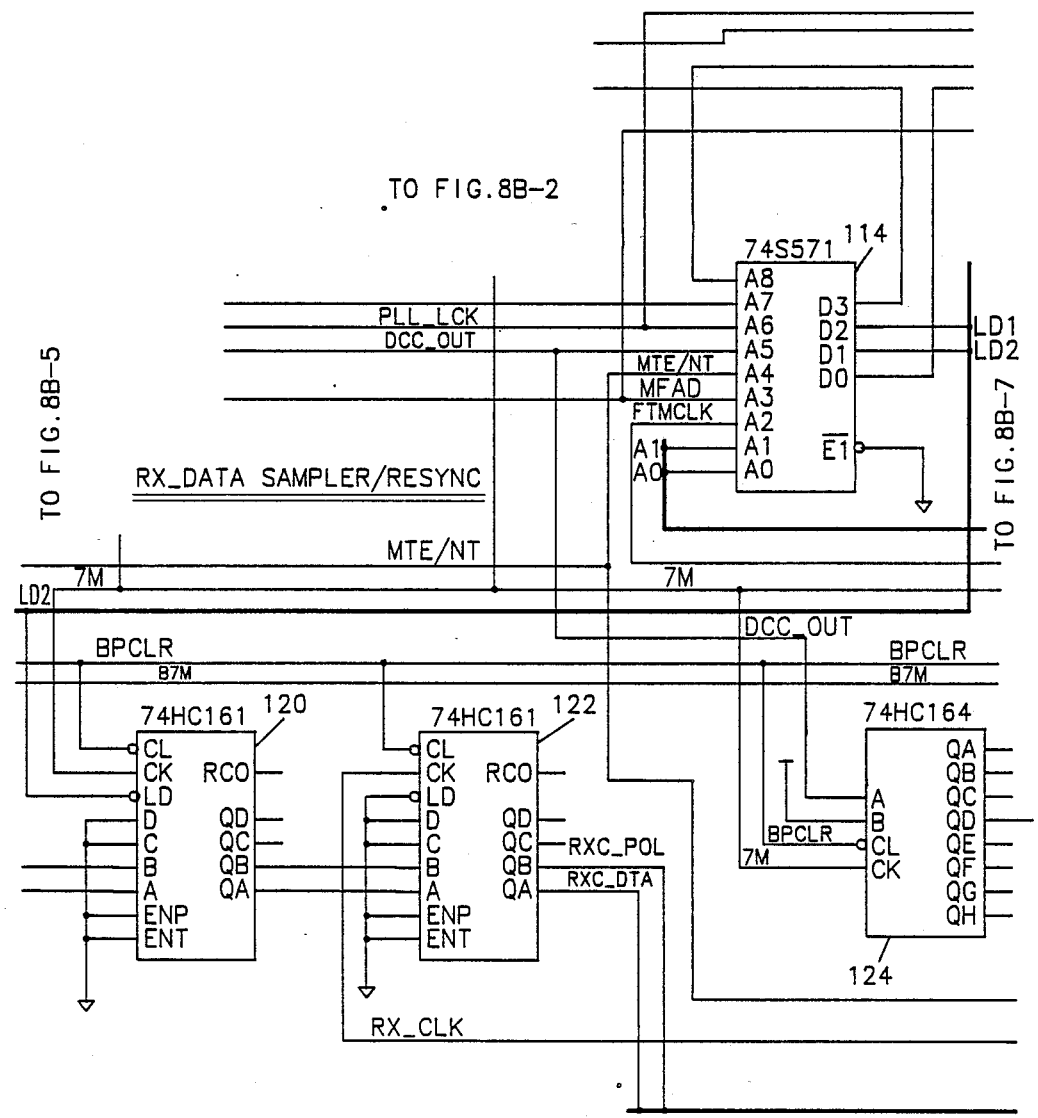
Figures 7, 8B:
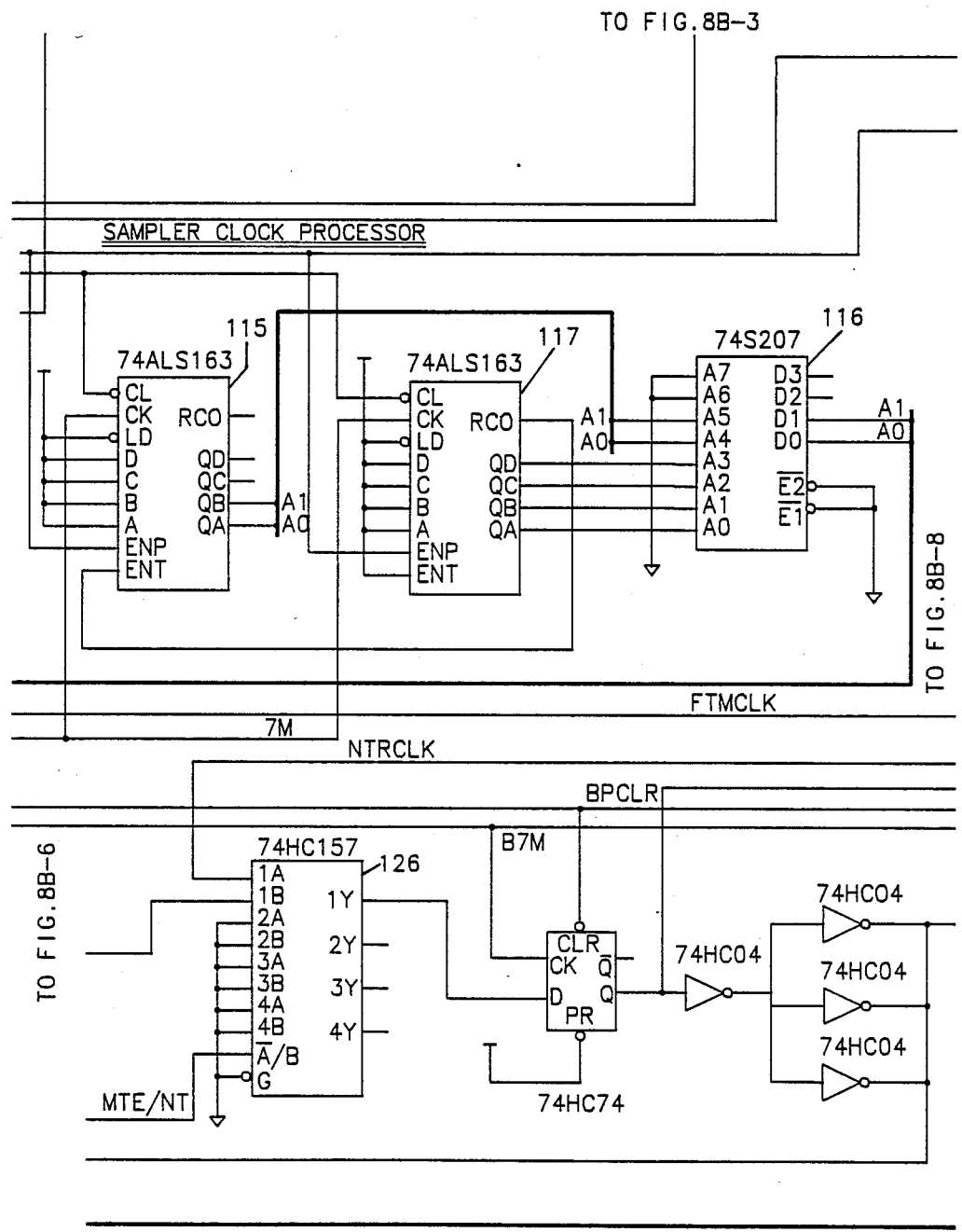
Figures 8, 8B:
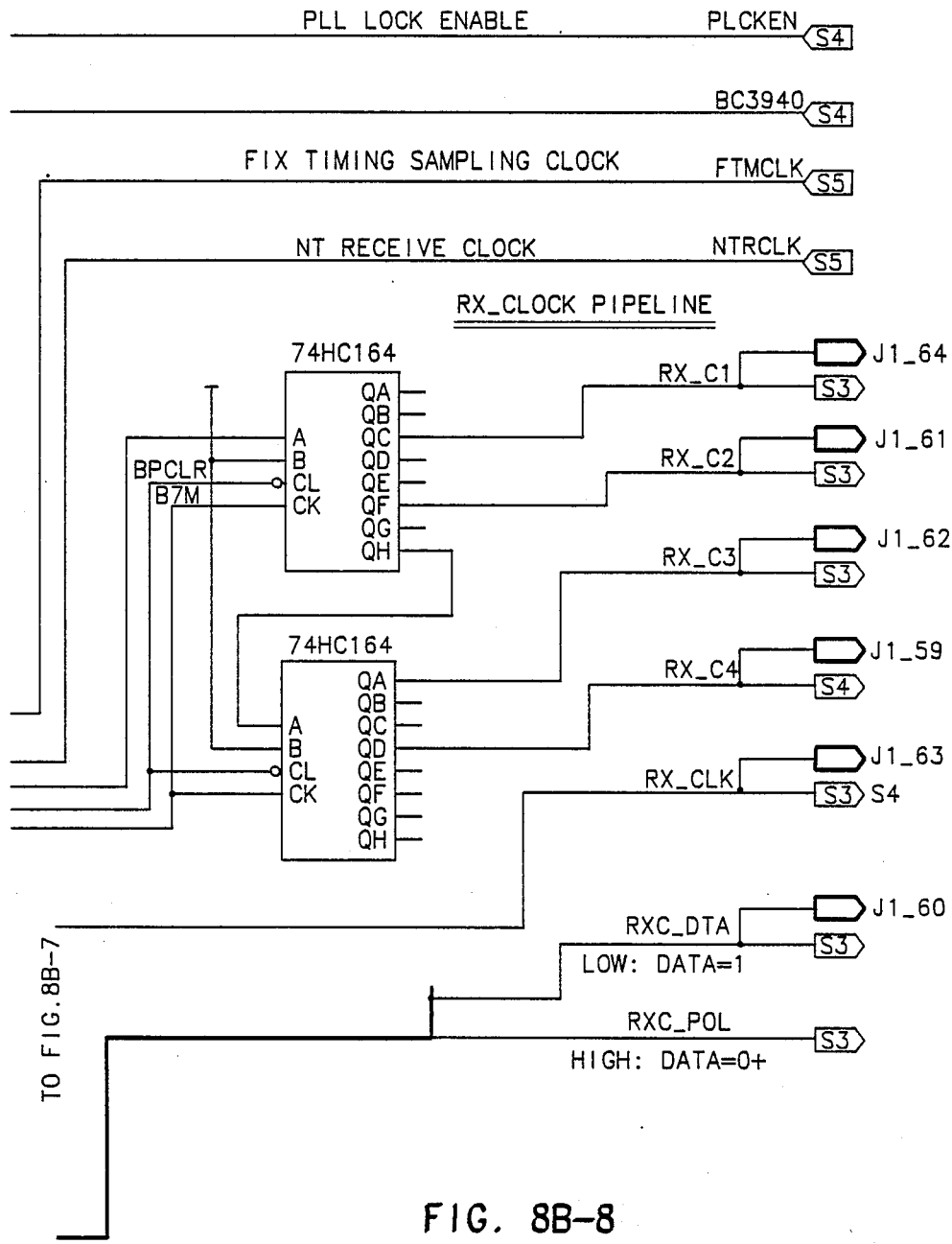

Referring now to FIG. 8B-5, control ROM 86 is in-lock with a PLL timing recovery circuit. The program coding ".AEQCTL.src" for equalizer control ROM 86 is provided on microfiche appendix. An auto-threshold circuit should be settled-out, e.g., the slicing level of component 34 tracks the peaks of the equalizer output. The "DCC-OUT" signal, or digital-controlled-clock output, controls the up/down of the error integrator counters 88, 90, 92. The DCC-OUT output also equals the timing-recovery clock from the PLL or PLL clock available at pin QD of component 85 (see FIG. 8B-2); low to high transitions are normally aligned to the center of the "TOPP" signal if the input needs no equalization, e.g., short connection between TE and NT.

The counters 88, 90, 92 are enabled when the "TANDT" signal is high. This signal is available by ANDing the "TOPP" and "TOPPM" signals. If the auto-threshold circuit is not settled, the "TANDT" signal will have either no output or a full output such that there will be no up or down counts passed on to the counters. In the case of no output, the counters are not enabled. In the case of a full output, the up counts will be equal to the down counts since the "DCC-OUT" signal is centered about the enable window "TANDT". In other words, the adaptive equalizer is automatically disabled when the threshold is not settled.

If the RX input is well equalized, the "TOPP" signal will be centering at the PLL clock rising edges so that up counts equal down counts and no step changes are passed onto component 19 (FIG. 8A-1).

Counters 88, 90 and 92 form a dual speed (8 or 12-bit) error integrator. The integrator has a high tracking-rate when the circuit starts receiving signal after the reset due to the INFO 0 signal, and a low tracking-rate after "frame in-lock" plus 8 good frames. The selection is controlled by the "AEQSPD" signal derived from the frame synchronizer/lock detector. During the low-speed mode, the "AEQWDW" and "BSLOTS" signals are enabled. The "AEQWDW" signal is available at pin A0 of component 86 (see FIG. 8B-5) and is derived from the PLL clock, with a width of window equal to 25% of a bit period, with centering at PLL clock rising-edges. The "BSLOTS" signal is available at pin A4 of component 86.

If the RX input equals INFO 0, i.e., the BIO signal is low, then the equalizer is reset to flat gain, i.e., no equalization. If in NT fixed timing mode, then the equalizer is disabled, i.e., there is no equalization. Component 94 is a step-update D-latch which is clocked after low-to-high transitions of the "TOPP" signal so that distortion at the equalizer output due to injection charge of component 19 during step changes is forced to the center of 0+ bit cells. Otherwise, detection errors are caused.

The quotient algorithm digital phase-locked-loop portion of the circuit receives the timing signal strobe and the BIO signal as inputs. A binary phase detector with hold-go gating is implemented by using a function of the strobe (F-strobe) to latch a counter that is cycling through a baud. F-strobe is processed by control machine 96 (see FIG. 8B-4) which avoids correction for a no-strobe condition. Components 98 and 100 are no-strobe time-out circuits.

Speed value is calculated on a saturating (bi-direction) speed counter 102 and altered only when triggered by a strobe on a baud period enabled by the BIO signal. Speed is input to ROM 96 to generate the hold/go signal on a fast or slow basis to feed the digital-controlled-clock. The speed value is fed into the F-strobe monitor which creates a gating signal to the digital-controlled-clock allowing incremental phase to be executed for "x" number of times dependent on the speed.

Figure 2:
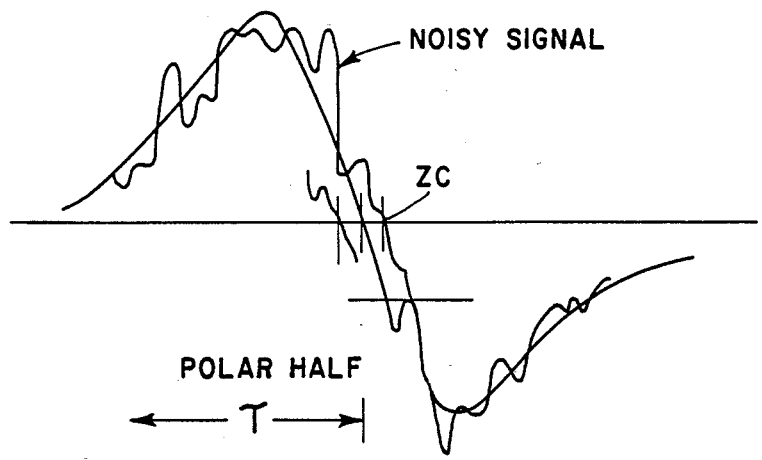
FIG. 2 is a simple waveform diagram illustrating a bipolar-pattern.

Refering to FIG. 8B-2, digital-controlled-clock 104 and latch 106 obtain the quotient digital-controlled-clock and output $Q_f$ which gates the SCLK signal to result in "RCLOCK". The RCLOCK signal is divided by divider 108,110 (see FIG. 8B-3) to quantify the phase position on a baud interval (baud rate recovered clock) for the binary phase-detector using the most significant bits and the range-phase-detector circuit using a magnitude-of-phase-error-comparator. The software generation state for the sequential machines in ROMs 96, 112, 98 and 104 are shown on microfiche appendix.

The no-strobe decoder 98, 100 used in this portion of the circuit increases the phase-locked-loop gain when seven consecutive missing synchronizing-strobes to the PLL are detected. Otherwise, the PLL would not be able to track an input with excess frequency-offset. The extreme case would be info 3 or 4 without marks at the B, D and SF channels.

The quotient algorithm digital phase locked loop copending U.S. patent application Ser. No. 108,371, filed by Wong Hee and Jesus Guinea of even date and commonly assigned herewith.

A received-data sampler and clocks switching logic utilizes ROMs 114 and 116, the coding algorithms for which are provided on microfiche appendix.

In the TE mode, the first sampler clock, i.e., pins LD and CK of component 118 (see FIG. 8B-5), experience a 0.5 pipeline delay after the PLL clock. Thus, the "Signal Eye" at the filter output is sampled at maximum "eye" opening. The second sampler clock, i.e., pins LD and CK of component 120 (see FIG. 8B-6), experience 1 pipeline delay after the PLL clock, allowing data to be passed onto the third sampler. The third sampler clock, i.e., pin CK of component 122, experiences a 4.5 pipeline delay after the PLL clock. Since this clock is also used for the TX bit clock, the delay section, i.e., the tap point at component 124, will effect the alignment of the TX zero-crossings to the RX zero-crossings. An offset of 3-4%, TX zero-crossings lagging the RX crossings, is recommended.

In the NT adaptive timing mode, the first sampler clock, i.e., pins LD and CK of component 118, experience a 0.5 pipeline delay after the PLL clock. Thus, the "Signal Eye" at the filter output is sampled at maximum opening. The second sampler clock, i.e., pins LD and CK of component 120, as derived from a free-running counter with frequency synchronized to the TX bit clock. If the PLL is out-of-lock, the counter is phase synchronized to the PLL clock with rising edges equal 20 pipeline delay (half of a bit period) after rising edges of the PLL clock. If the PLL is in-lock, the synchronizing link to the PLL is defeated and the counter left free-running and the frequency is synchronized to TX bit clock. Thus, it samples at maximum opening of the signal I for the first sampler 118. The third sampler is clock 122. Therefore, the received data output has the same timing as the transmitter.

Figures 1, 8C:
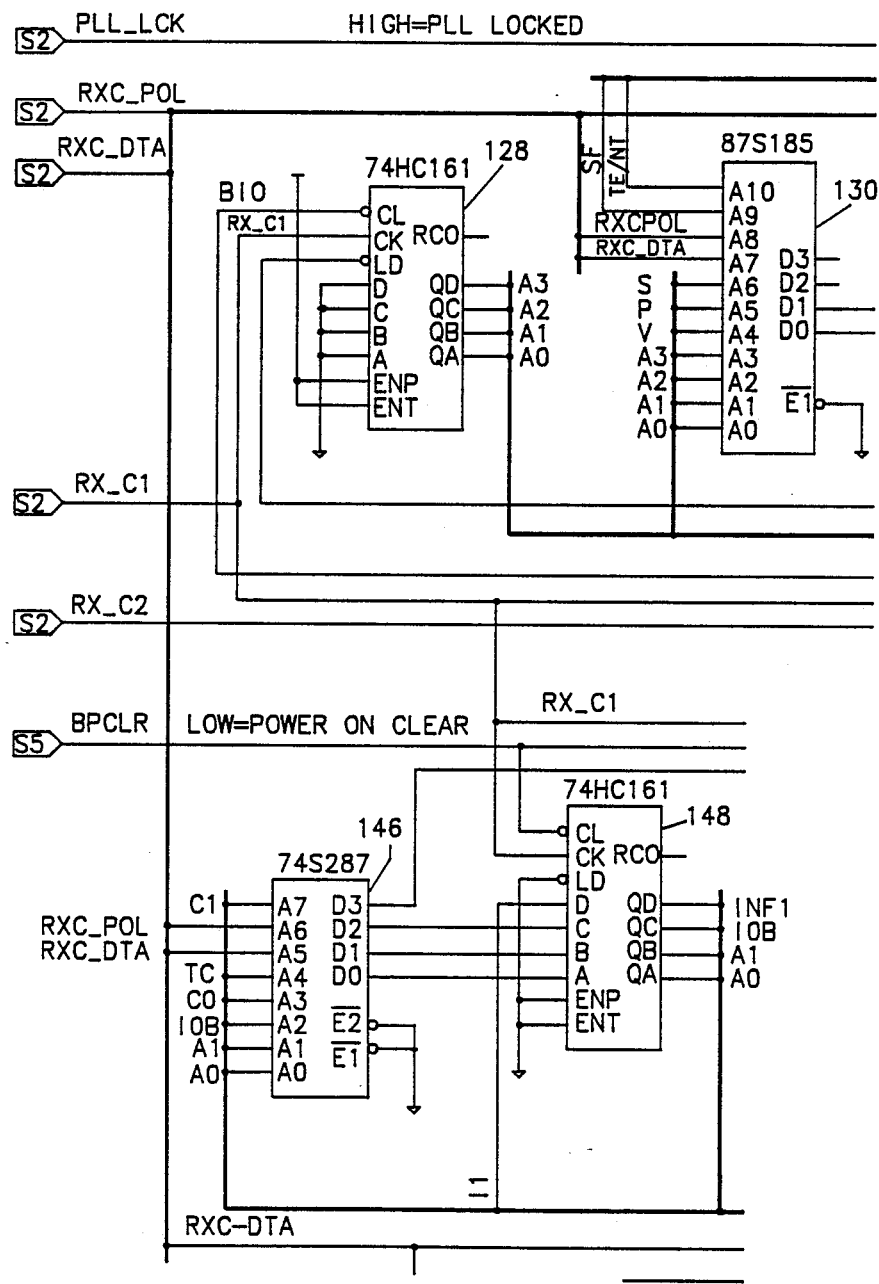
Figures 2, 8C:
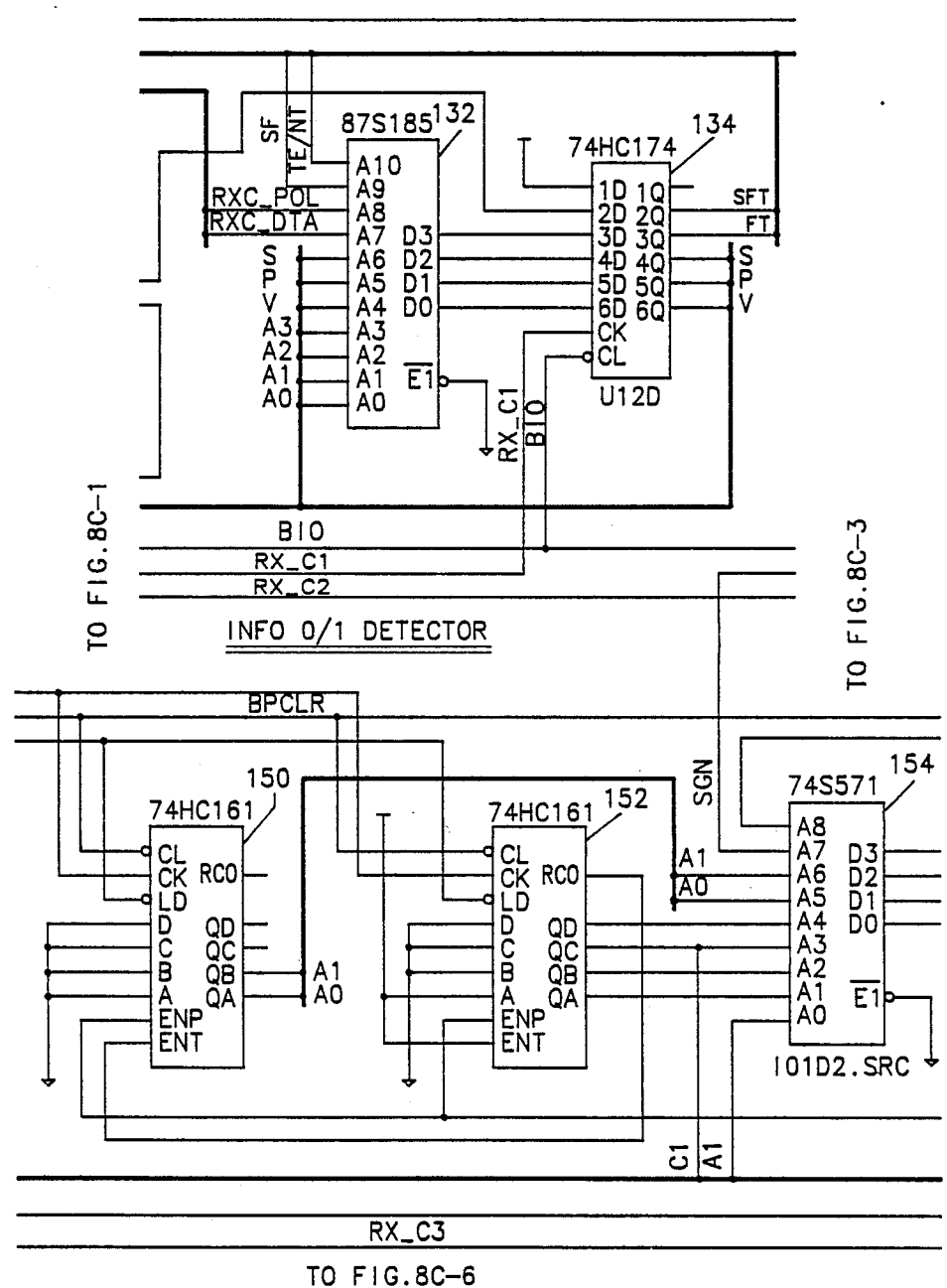
Figures 3, 8C:
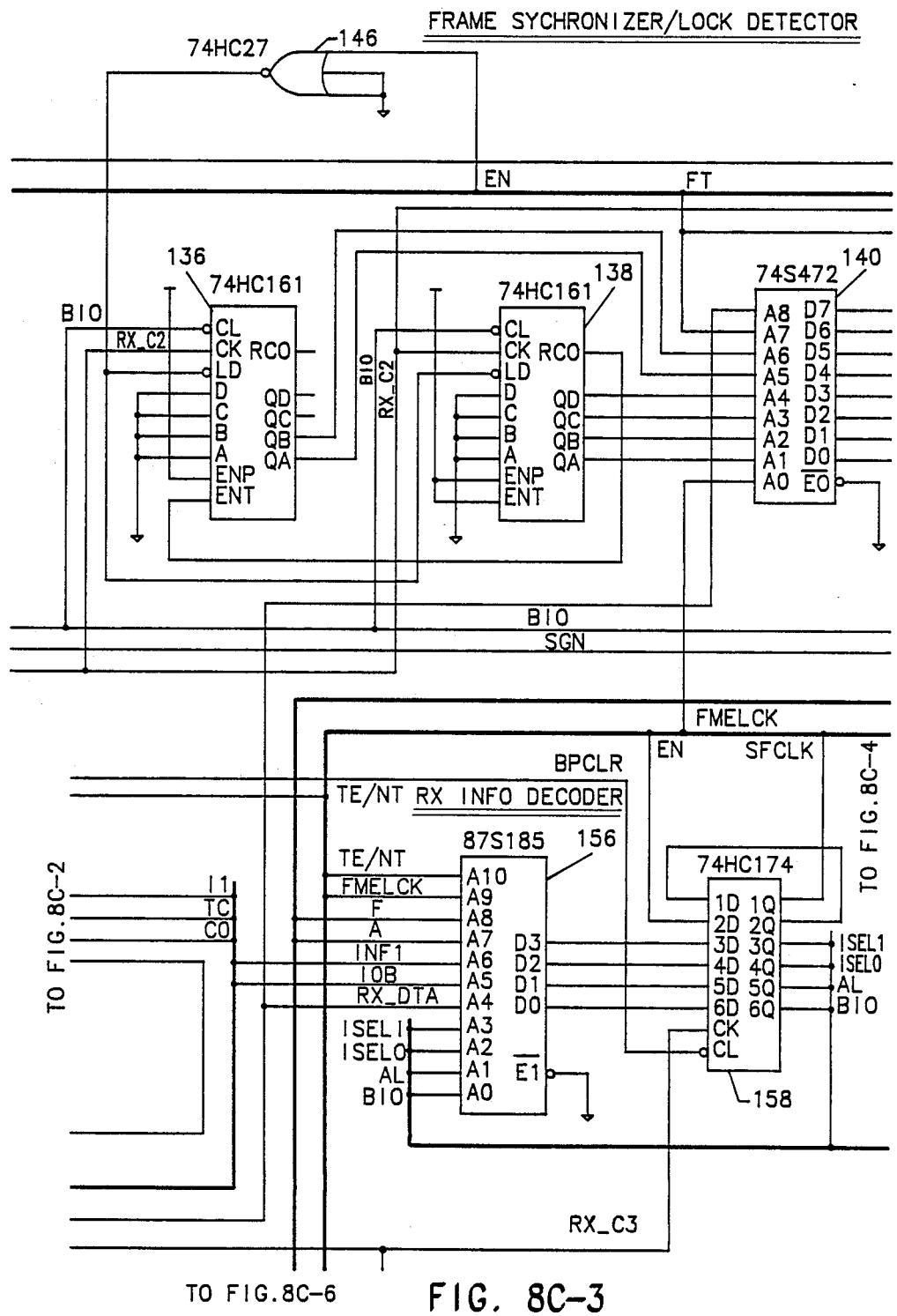
Figures 4, 8C:
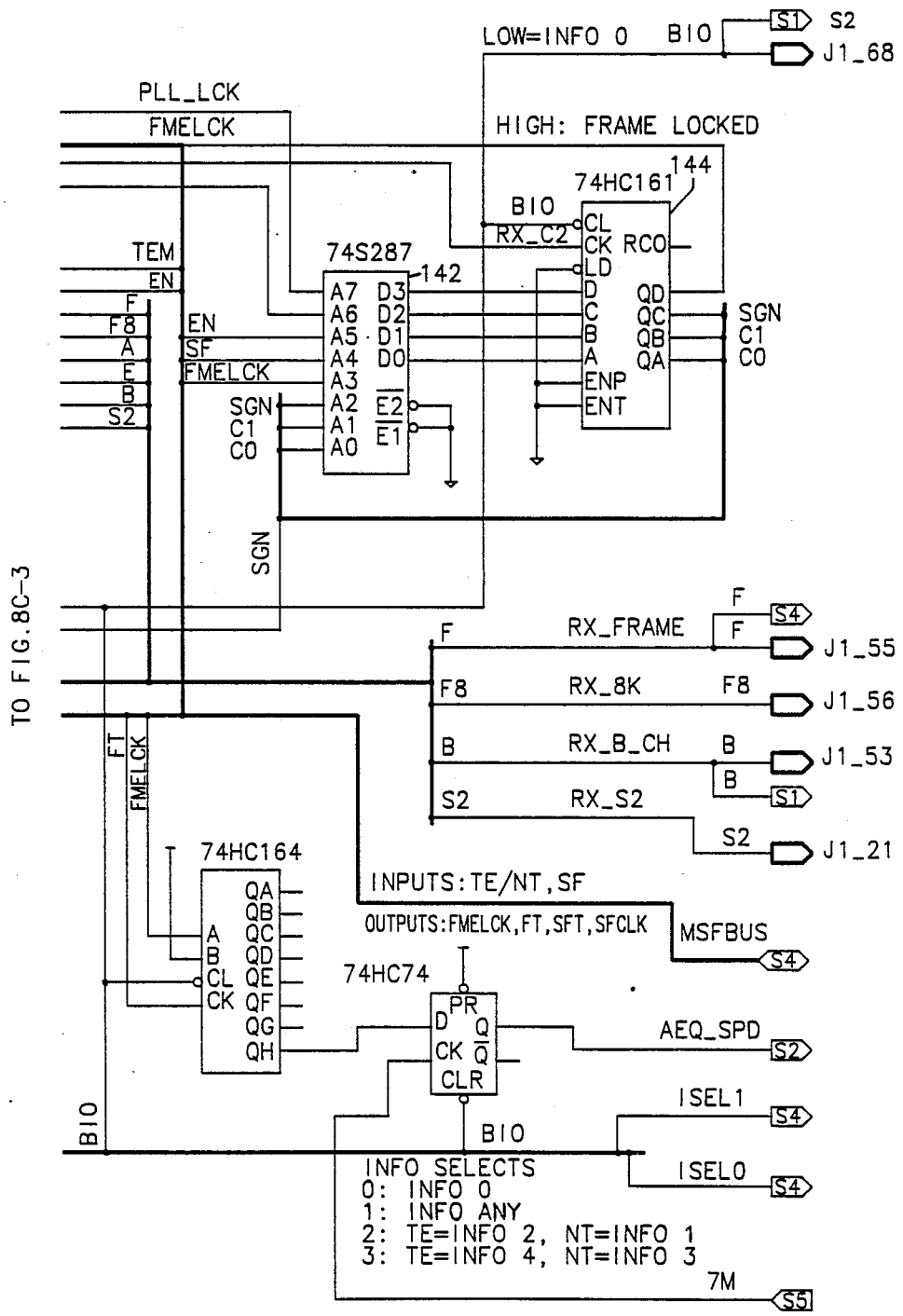
Figures 5, 8C:
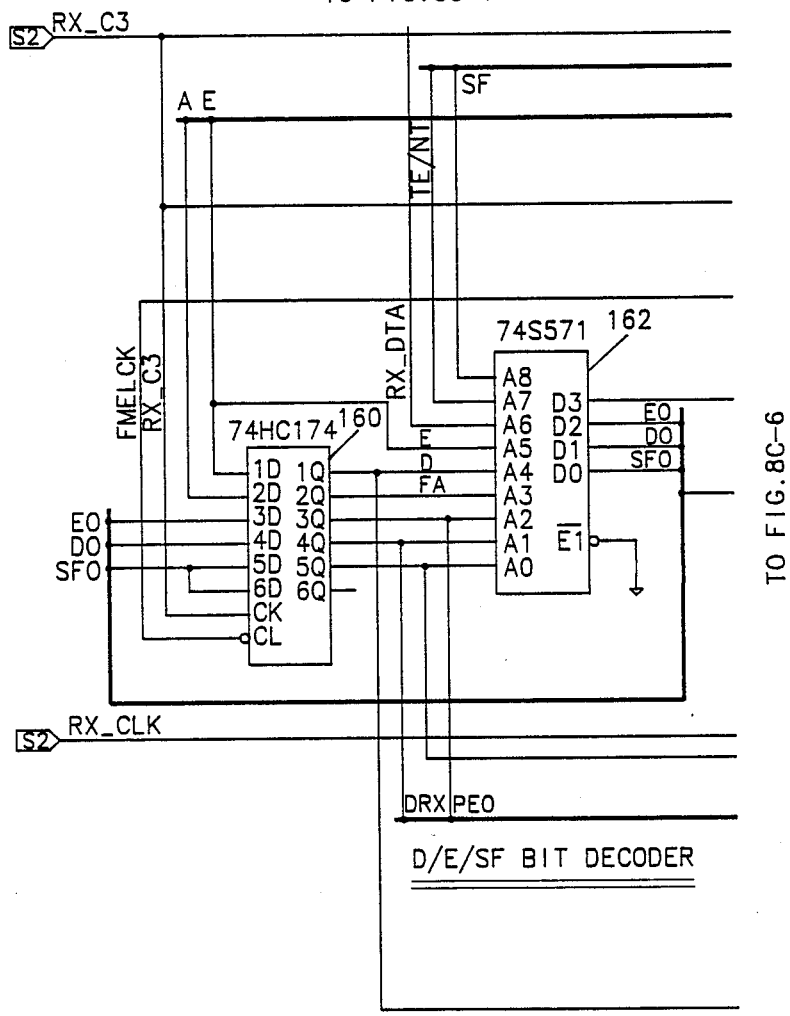
Figures 6, 8C:
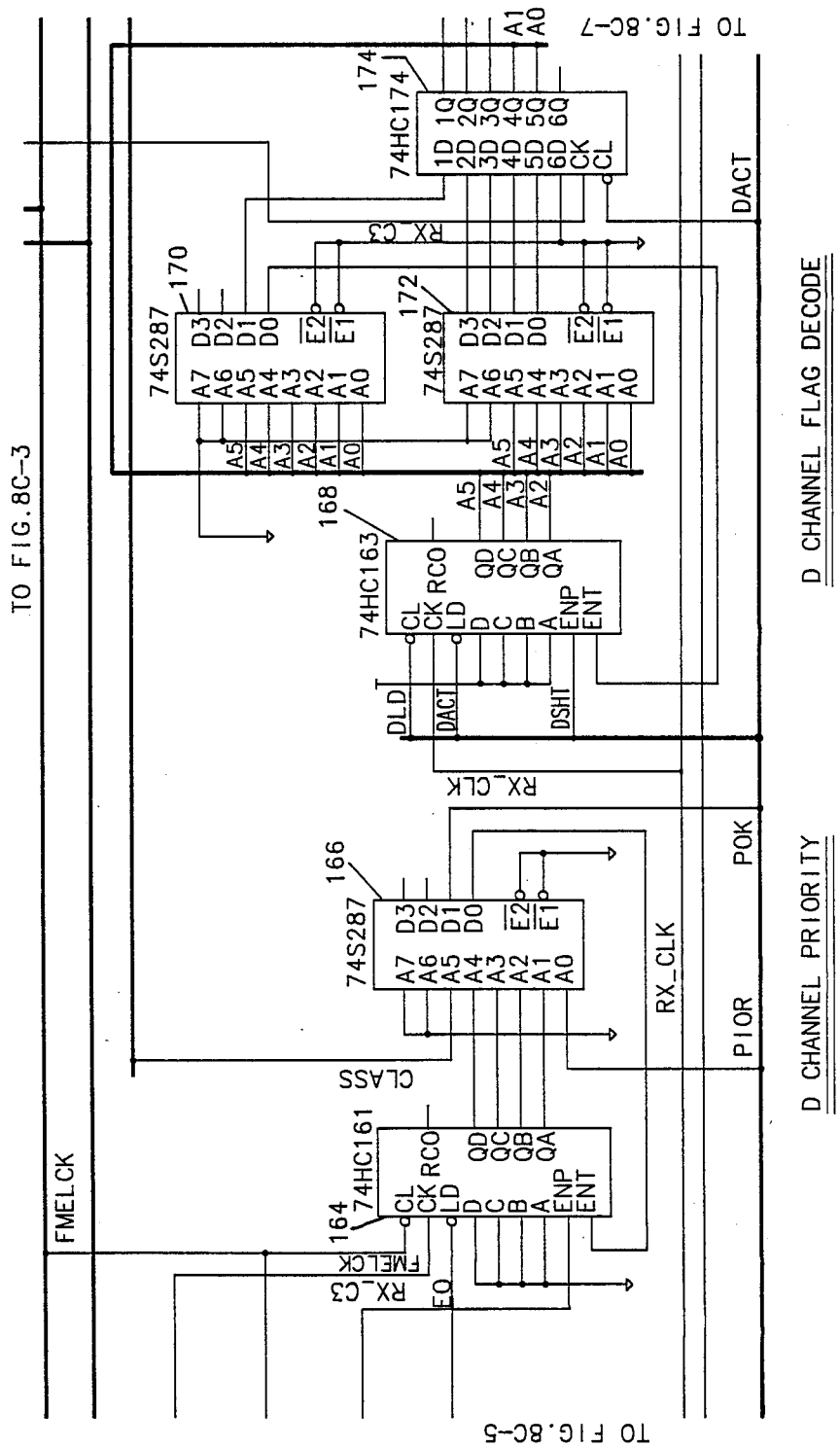
Figures 7, 8C:
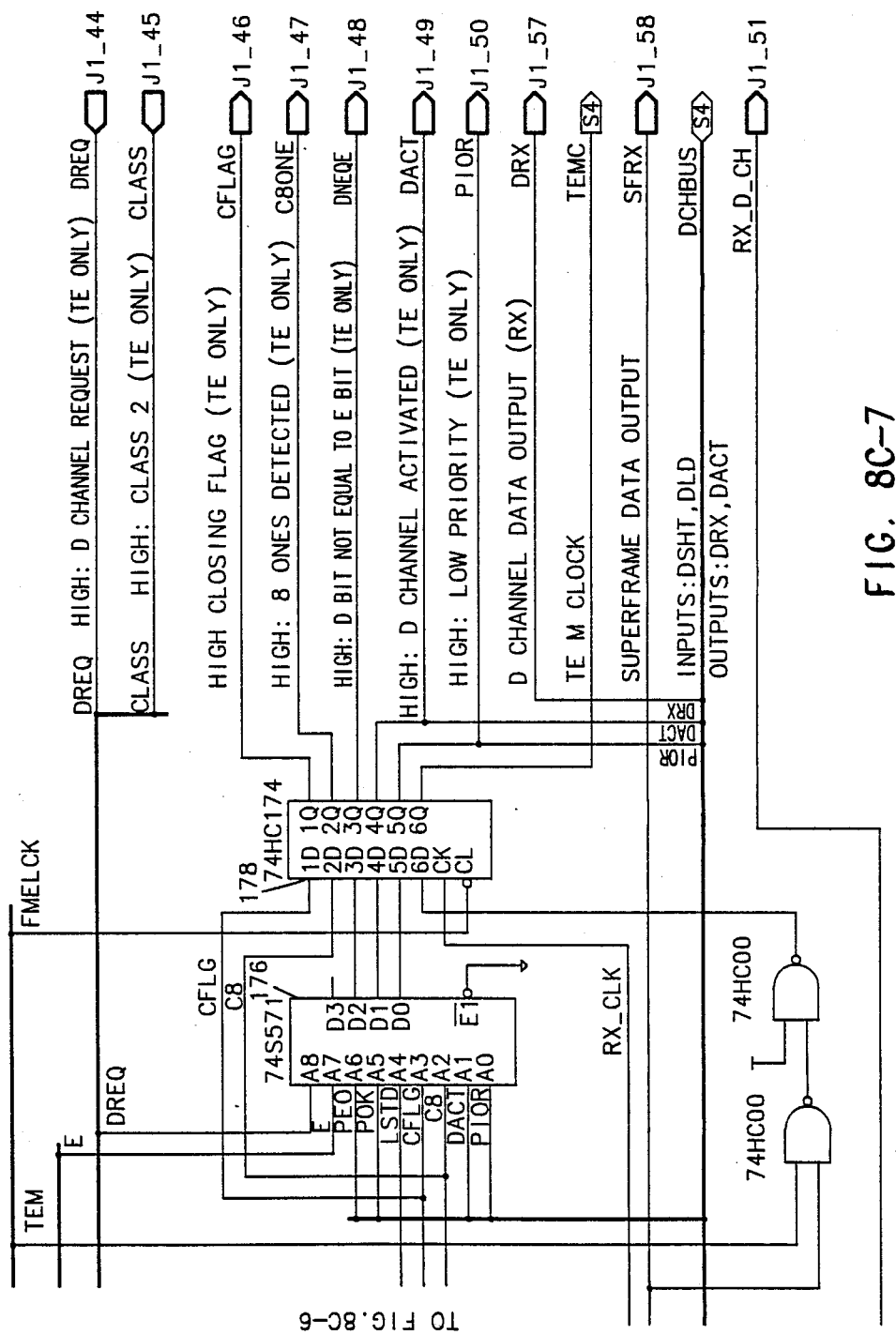

In the NT-fixed timing mode, the first sampler clock 118 has a 0.5 pipeline delay after the fixed timing clock, i.e., pin A2 of component 114, i.e., a fixed relationship to the TX bit clock. The second sampler clock 120 experiences a 1 pipeline delay after the fixed timing clock to allow data to pass onto the third sampler. The third sampler clock 122 is connected to the TX bit clock so that the receive data output has the same timing as the transmitter. Referring to FIGS. 8C-1 and 8C-2, components 128, 30, 132 and 134 form a frame trigger pulse decoder. As shown in FIGS. 7C-3 and 7C-4, components 136, 138, 140, 142, 144 and 146 form a frame synchronizer/lock detector. Three consecutive good frames plus the PLL in-lock equals a frame in-lock. Three consecutive BAD frames equal a frame out-of-lock. If the input equals INFO 0 (BI0=low, then the frame is out-of-lock). The RX bit id outputs are as follows:

B1 channel: B (pin D1 of component 140)=high; F8 (pin D4 of component 140)=high

B2 channel: B (pin D1 of component 140)=high; F8 (pin D4 of component 140)=low

S2 channel: S2 (pin D0 of component 140)=high

D channel: Decoded as described below

SF channel: Decoded as described below

Note: F8 also provides half-frame timing

PROM 140 (see FIG. 8C-3) also decodes the polarity of the M bits (super frame) for generating the M-clock in the TE mode.

Refering to FIGS. 8C-1, 8C-2 and 8C-3, components 146, 148, 150, 152, 154, 156 and 158 combine to form info decoders. The info recognition criteria are as follows:

INFO 0: If no 0+ or 0− pulses for 64 data bits, BIO (bar info 0) goes low at frame boundaries.

INFO 1: NT mode, 8 consecutive "0011xxxx" frame received, "x" denotes either 0 or 1, the two consecutive 0s must be opposite in polarity and consistent through the 8 frames.

INFO ANY: Circuit detects INFO Any after receiving two opposite "0" pulses ("0+, 0−" or "0−, 0+"). If other info types can be unambiguously recognized the detector will flag the actual info types instead. Normally, INFO Any indicates the receiving of I2, I3 or I4 when the framing circuit is not in-lock, i.e., loss of framing or before locking.

INFO 3: NT mode, frame in-lock

INFO 2: TE mode, frame in-lock, "A" bit=binary 0 (0+ or 0−)

INFO 4: TE mode, frame in-clock, "A" bit=binary 1

A D-channel access/E-channel logic circuit is formed by components 160, 162, 164, 166, 168, 170, 172, 174, 176 and 178 (see FIGS. 8C-5, 8C-6 and 8C-7). Components 160 and 162 are a D/E/SF transmit-data decoder. Pins D3 and D2 of component 162 provide the E-bit outputs which control "C" counter 164. Pin 3Q of component 160 is a pipelined E-bit output which drives component 176 for transmission E-bit data input to the transmitter in the NT mode. Pin 5Q of component 160 is the super-frame transmit-data output for NT mode only. In the TE mode, this pin decodes the inverted $F_A/N$ bits from the NT output to qualify the generation of the M-clock. Components 164 and 166 form a "C" counter, with pin D1 of component 166 high if the D-channel is available, i.e., "C" count is $\geq$ the current priority level. Both the class and the priority signals are inputs to this counter. The circuit is disabled if the frame is out-of-lock. Components 168, 170, 172 and 174 combine to form a D-channel flag-decoder. The LSTD signal or last-transmitted D-bit from the local transmitter, on pin IQ of component 174 feeds component 176 for error flag generation. If this flag is found true, the D-channel access is terminated immediately, i.e., the DACT signal on pin A1 of component 176 goes low. The transmitter sends binary 1s in the D-channel afterward regardless of the state of the transmitter data input. There are no more DSHT (D-channel data shift-/enable) pulses to the outside world for requesting data. Priority remains the original value, i.e., high priority.

The HDLC Closing flag CFLG at pin 2Q of component 174 goes high after the transmission of "01111110 D...D 01111110"in the D-channel, where "D...D" =any data pattern except HDLC flags. If a continuous seven 1's pattern is embedded in the "D...D" sequence, then the flag "01111110"after the seven 1's pattern is considered to be the opening flag again. Without the seven 1's pattern, this sequence would be the closing flag. The next "01111110", i.e. third flag starting from the beginning of the transmitted message, becomes the actual closing flag. It should be noted that the "0" between two flags can be shared by the two flags: i.e. "011111101111110" contains an opening flag and a closing flag. After the closing flag, the D-channel is considered to be deactivated. The circuit functions the same way as the deactivation caused by the D<>E error flag except that the priority is set to low priority.

The "C8" signal at pin 3Q of component 174 goes high if D-channel transmitted data was eight consecutive 1's. After this flag, the D-channel access is deactivated. This is similar to the closing flag case except there are no priority changes.

The D-channel request input DREG at pin A8 of component 176, connected to an external microcontroller, goes high if TE wants to access the D-channel. If pin A5 of component 176 is high, i.e. the D-channel is available, and DREQ is high, then DACT is high showing that the D-channel is activated. If any of the error flags (E<>D, CFLG, C8) are detected, then DACT goes low showing that the D-channel is deactivated priority output at pin 12 of component 178 is high (low priority) if deactivation is due to CFLG. If frame is out-of-lock during activation, then the D-channel access is terminated immediately the same way as caused by other flags. The implementation is achieved by resetting the D-channel circuit, including the C counter, to its power-up state. In other words, D-channel access is only possible when the frame synchronizer is in-lock.

Figures 1, 8D:
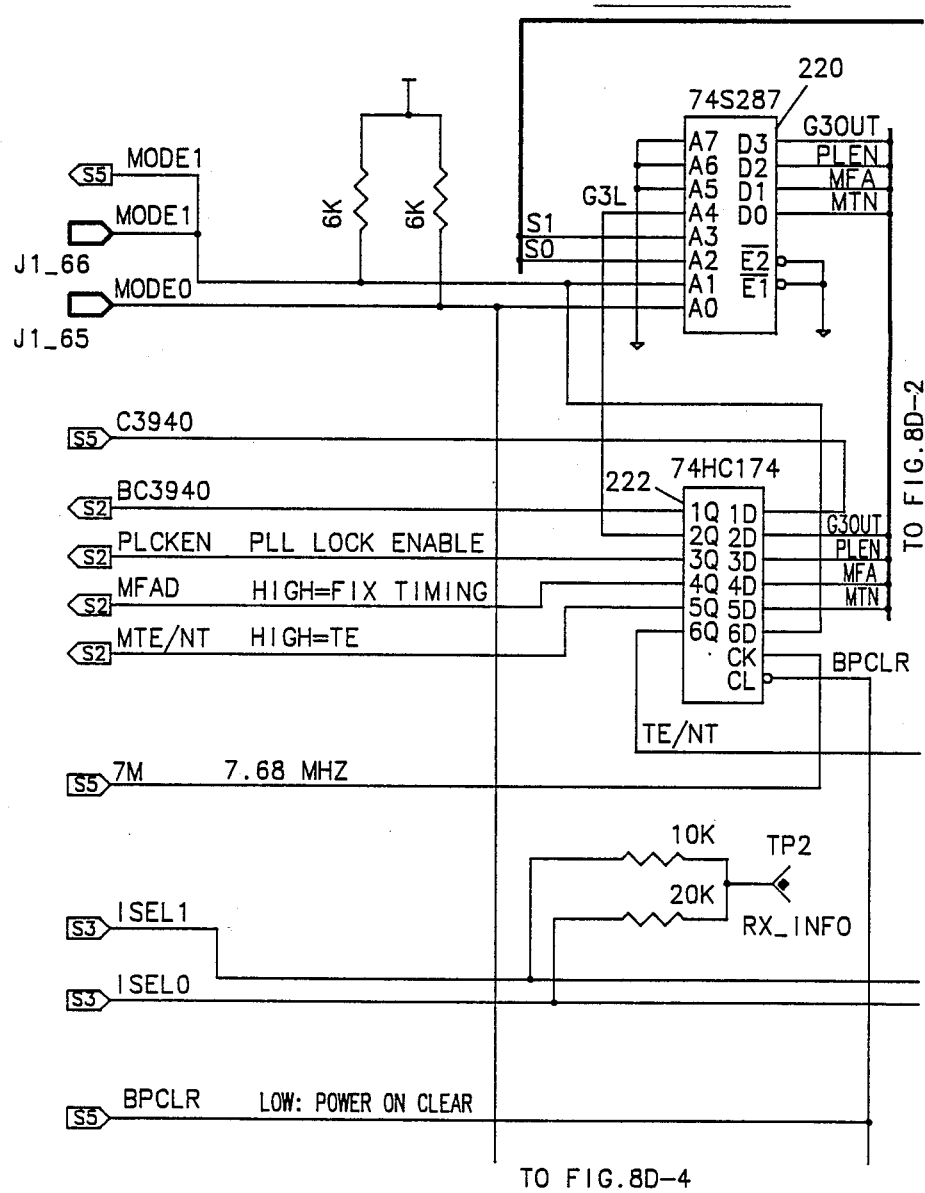
Figures 2, 8D:
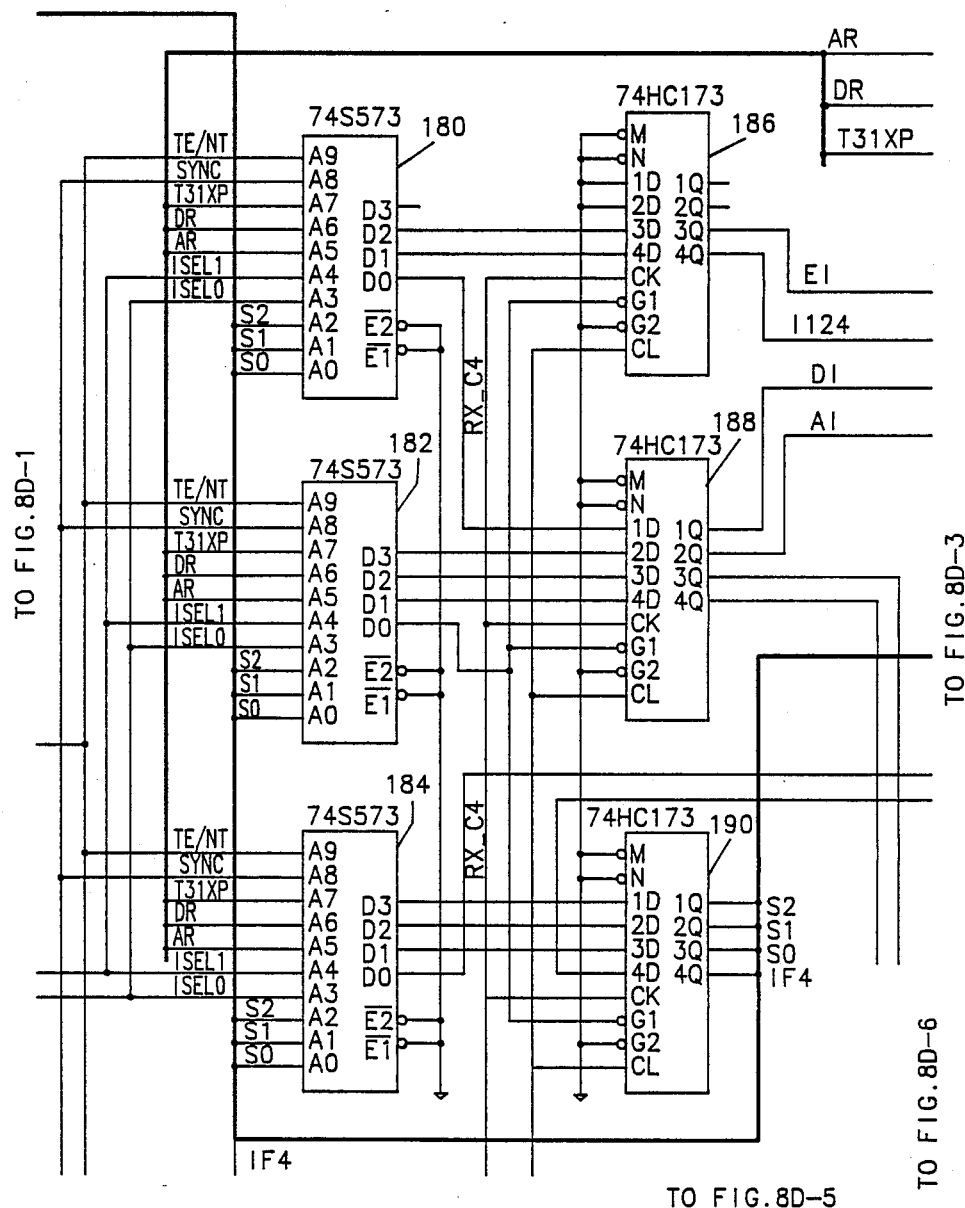
Figures 3, 8D:
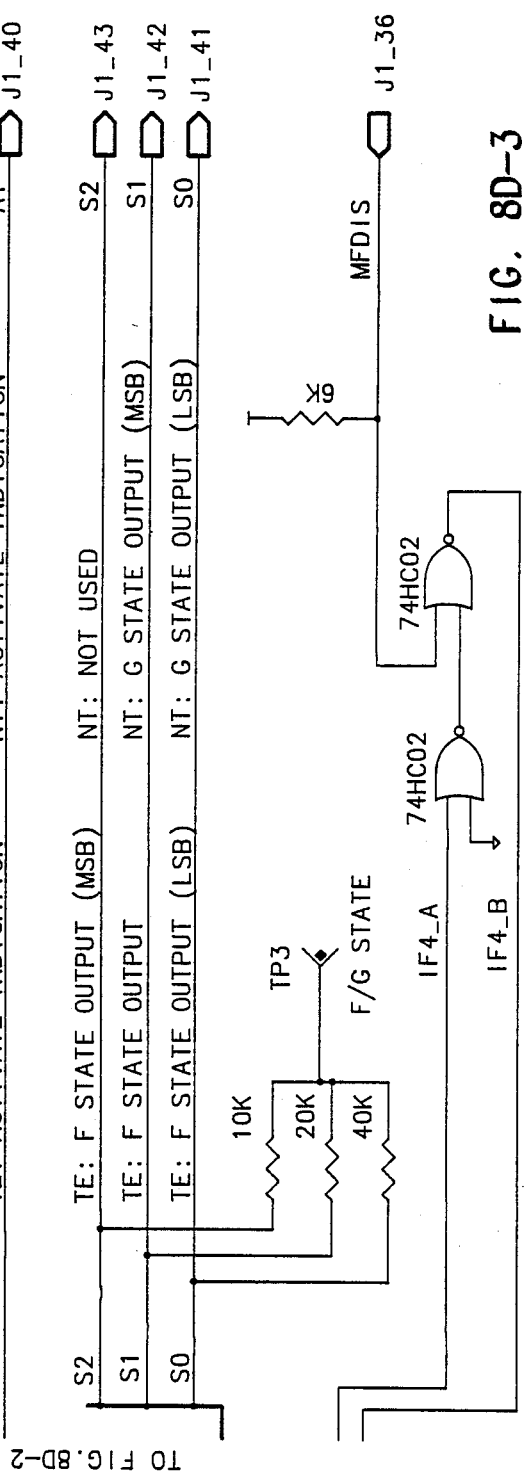
Figures 4, 8D:
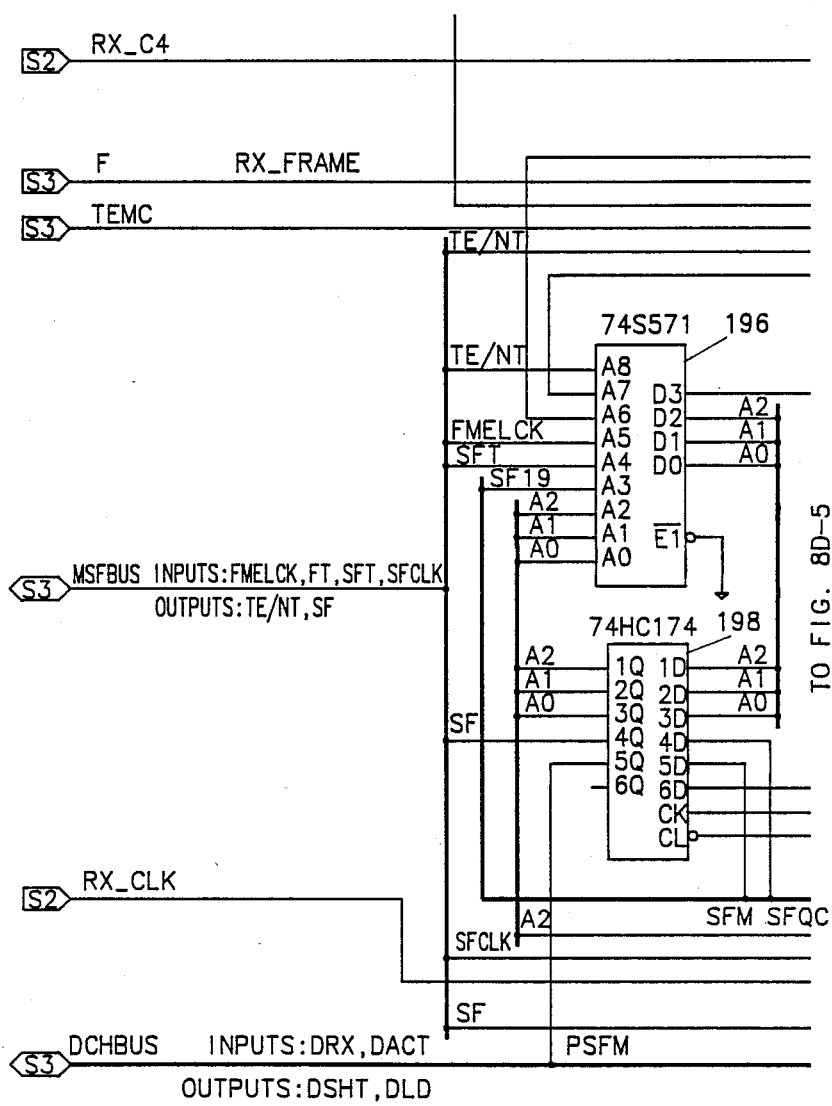
Figures 5, 8D:
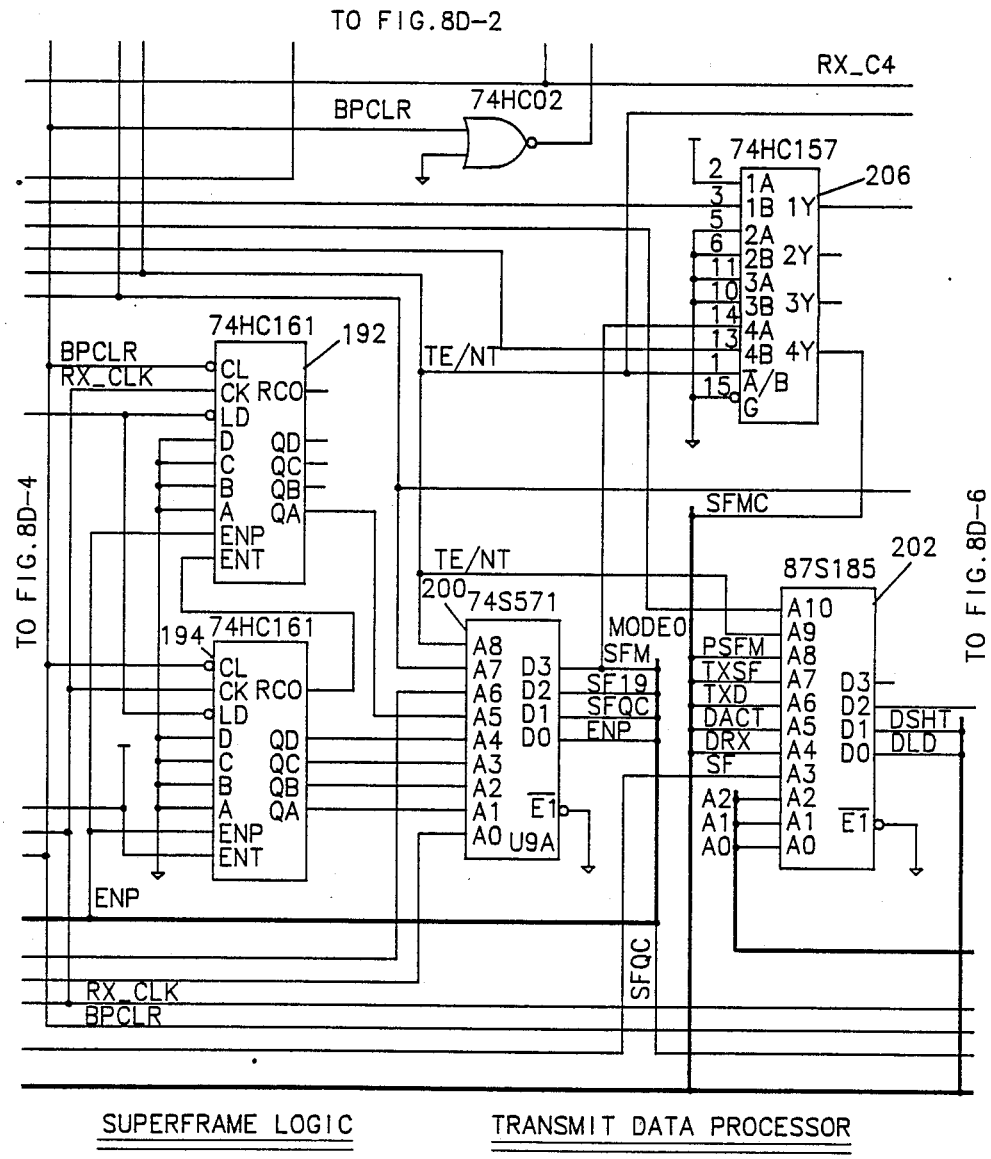
Figures 6, 8D:
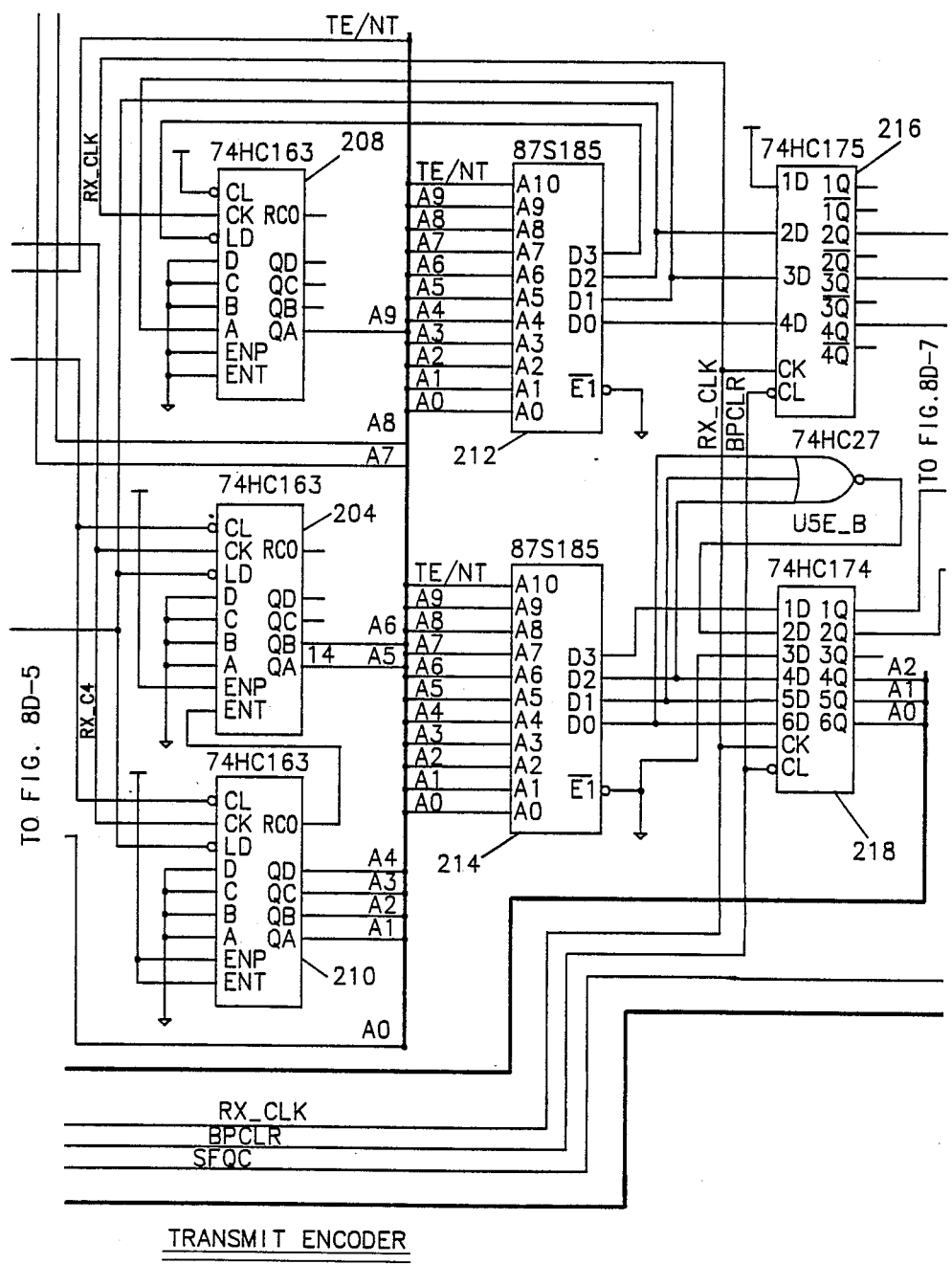
Figures 7, 8D:
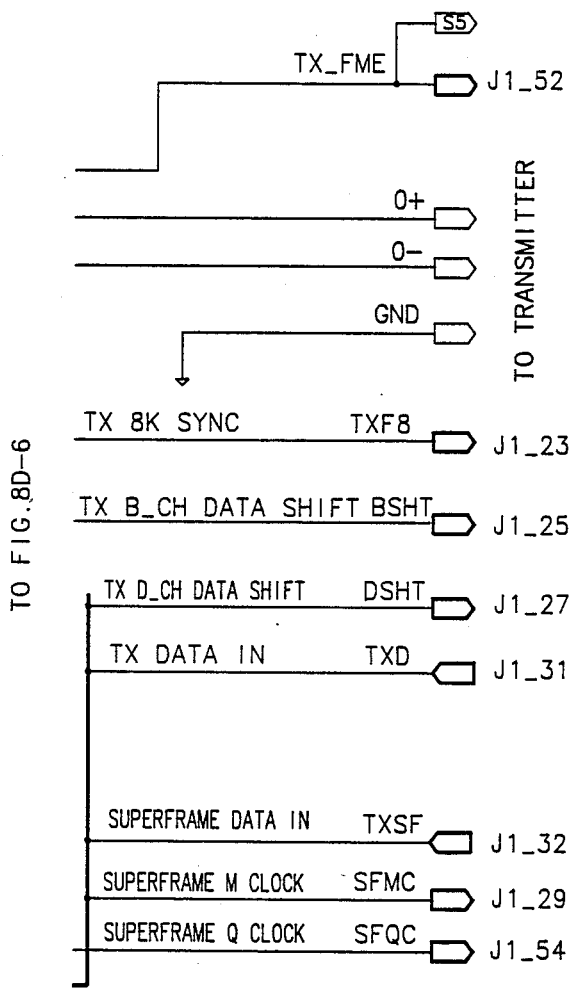

Referring to FIG. 8D-2, activate/deactivate logic is provided by components 180, 182, 184, 186, 188 and 190. The coding algorithm "ADLGC.src" for ROMs 180, 182 and 184 is provided on microfiche appendix. The microfiche appendix also provides the recommended subroutines for external up and input latch circuit for AR (Activation Request), DR (Deactivation Request) and T31XP (Timer 3/1 expiry). Note that I124 indicates the receiving of INFO1(NT) or IN-FO2/4(TE). This signal is sent to the external microprocessor through the uwire for activation acknowledgment.

Components 192 and 194 (see FIG. 8D-5) form a frame counter for deriving superframe sequence, i.e. modulo=20 in NT mode, 5 in TE mode. Components 196 and 198 (see FIG. 8D-4) form a superframe counter controller. In the TE mode, counter 192, 194 is synchronized to the SFT (superFrame trigger) signal from the frame-trigger decoder described above. If $>=3$ consecutive SFT's, then the circuit assumes in lock, i.e. TE superFrame TX channel is enabled. If three consecutive SFT pulses are found missing or INFO0 is detected or the frame synchronizer is out-of-lock, then the circuit assumes out-of-lock, i.e. TE superFrame TX channel is disabled. In the NT mode, counter 192, 194 is synchronized to transmitter. If TX equals INFO4, then the superframe sequences are transmitted.

Component 200 (see FIG. 8D-5) provides superframe enable/disable and clock switching functions. Pin D3 of component 200 derives a "1 out of 20" frame sequence from the outputs of counter 192, 194 for generating the M clock SFMC in the NT mode if TX=INFO4. The SFMC signal is switched to receive its input from the frame synchronizer in the TE mode (pin D3 not active). In the NT mode, the M clock provides timing information to the transmit data processor 202 for encoding the M(S1) bit.

Pin D1 of component 200 derives a "1 out of 5" frame sequence from the counter 192, 194 outputs for generating the Q clock SFQC. In the NT mode, the Q clock is enabled if TX=INFO4. In the TE mode, the Q clock is enabled when superFrame timing is in-lock. This clock feeds two elements: transmit data-processor 202 and frame synchronizer/lock detector 204. The first connection provides timing information to the transmitter for encoding the Fa/N (INFO4) or Fa/L (INFO3) bits. The second connection forbids the frame locking circuit 204 from responding to missing frame trigger pulses during superframes.

The S2 signal is data output in the TE mode and can be decoded from RXC-DTA with RX-S2. The S2 signal is also the data-input to the NT transmitter.

Refering to FIGS. 8D-5 and 8D-6, transmit data processor/encoder is formed by components 206, 202, 208, 204, 210, 212, 214, 216 and 218. The signal TXD at pin A6 of component 202 is the TXD TX B/D channel data input, 1=0+ or 0−. The B-channel data path is enabled by BSHT and TXF8 at pins 2Q and IQ respectively, of component 218. Channel B1 is selected when TXF8 is high and BSHT is high; B2 is selected when TXF82 is low and BSHT is high.

The TXF8 signal also provides half-frame timing.

In the TE mode, the D-channel data path is enabled by DSHT at pin D1 of component 202. If the D-channel is not activated (DACT=low), then DSHT pulses are not outputed and transmit data is automatically set to binary 1. In the NT mode, the DRX signal at pin A4 of component 202 and RX the E-bit TX data input is connected to the D-channel RX output and multiplexed by component 202 into the TX data path. Pin A7 of component 202 provides the superframe data input (TE mode only). The transmitter coding algorithm for components 212, 214 is provided on microfiche appendix.

In the NT mode, the transmitter is frame synchronized to an external source (U-Interface) by either shortening (39 counts) or widening (41 counts) the last L bit period. In the TE mode, the transmitter is frame synchronized to the RX-frame with a 2-bit offset.

As shown in FIG. 7D-1, components 220 and 222 provide TE/NT select. In NT modes, the receiver is configured as adaptive timing mode (similar to receiver in TE mode) for receiving asynchronous Infol signal. After INFO1 is recognized, the receiver is switched back to normal mode. In the NT adaptive timing mode, if NT changes from the G3 state to the G2 state, due t loss of framing or upon receiving INFO0, pin 3Q of component 222 will issue a low going pulse for resetting the PLL locking circuitry, thus causing phase re-estimation of the second sampling clock.

Referring now to FIGS. 8E-1, 8E-2 and 8E-3, an NT frame synchronizer is formed by components 222, 224, 226, 228, 232, 234 and 236. The NT receiving clock NTRCLK, pin QC of component 224, is at 192 KHz and is generated by dividing 7.68 MHz with a modulo of 40 in components 232 and 234. For each bit period, there are four 7.68 MHz clocks. The NT frame sync input NTFSYN at pin B of components 224 is provided for an external 8KHz sync: signal to synchronize the framing of the transmitter. If there is no signal at this input, the transmitter frame clock, provided at pin A9 of component: 236, is free running at the sub-multiple (/40, 40 clocks per bit; and then /48, bits per frame) of the crystal frequency (7.68 MHz). If an external sync-signal is applied to this input, then the counters 232, 234 will either add or subtract a count during the last bit of each frame until the frame-timing is frequency locked to the positive edges of the external input. The coding algorithm component 236 does not allow consecutive opposite changes (e.g., 39 in one frame and 41 in the next frame): the counters have to step through the normal state (/40) before the next opposite change. The counters 115, 117 (FIG. 8B) used in the sampler-clock processor are also frequency-locked to the external sync signal in NT adaptive timing mode. This is accomplished by the signal BC3940 connecting between pin D2 of component 236 and pin ENP of component 117.

Figure 8E:
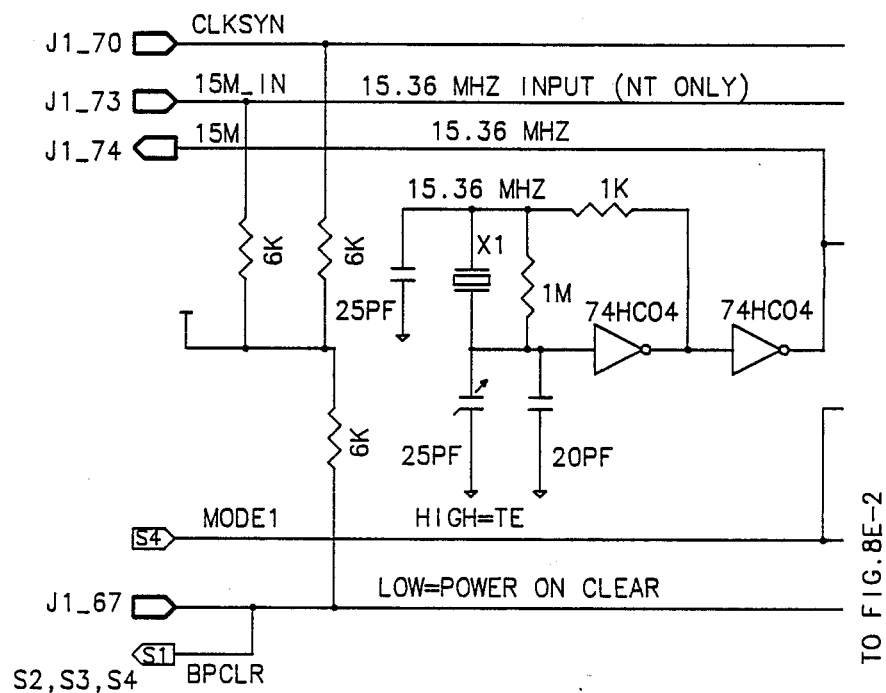
Figure 1:
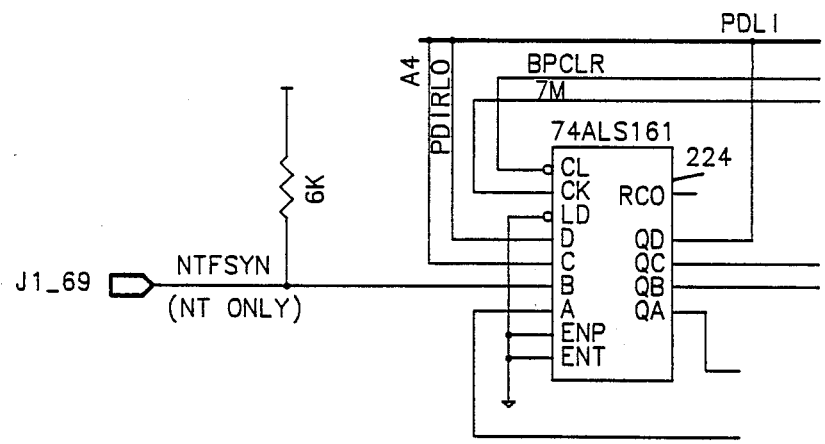
Figures 2, 8E:
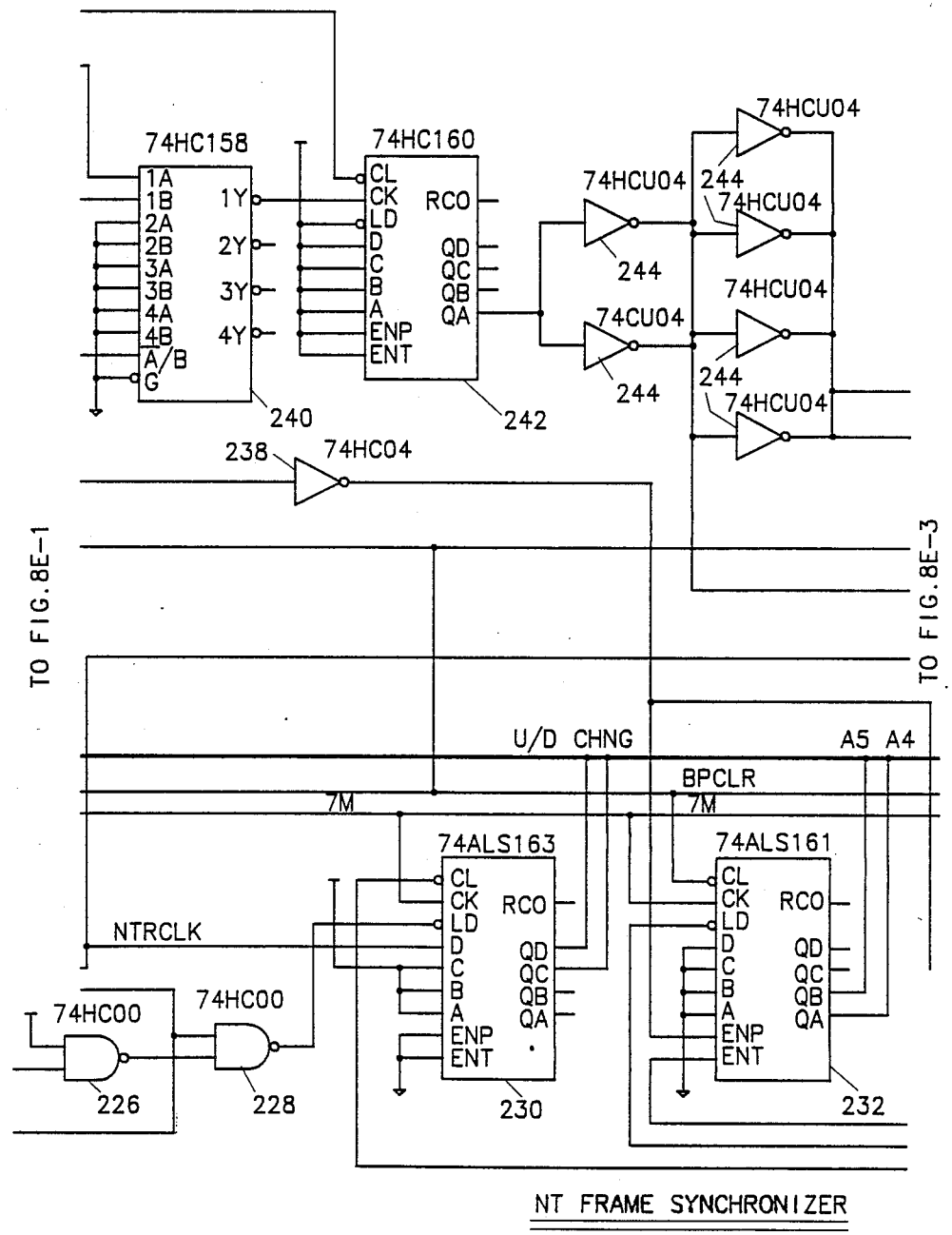
Figures 3, 8E:
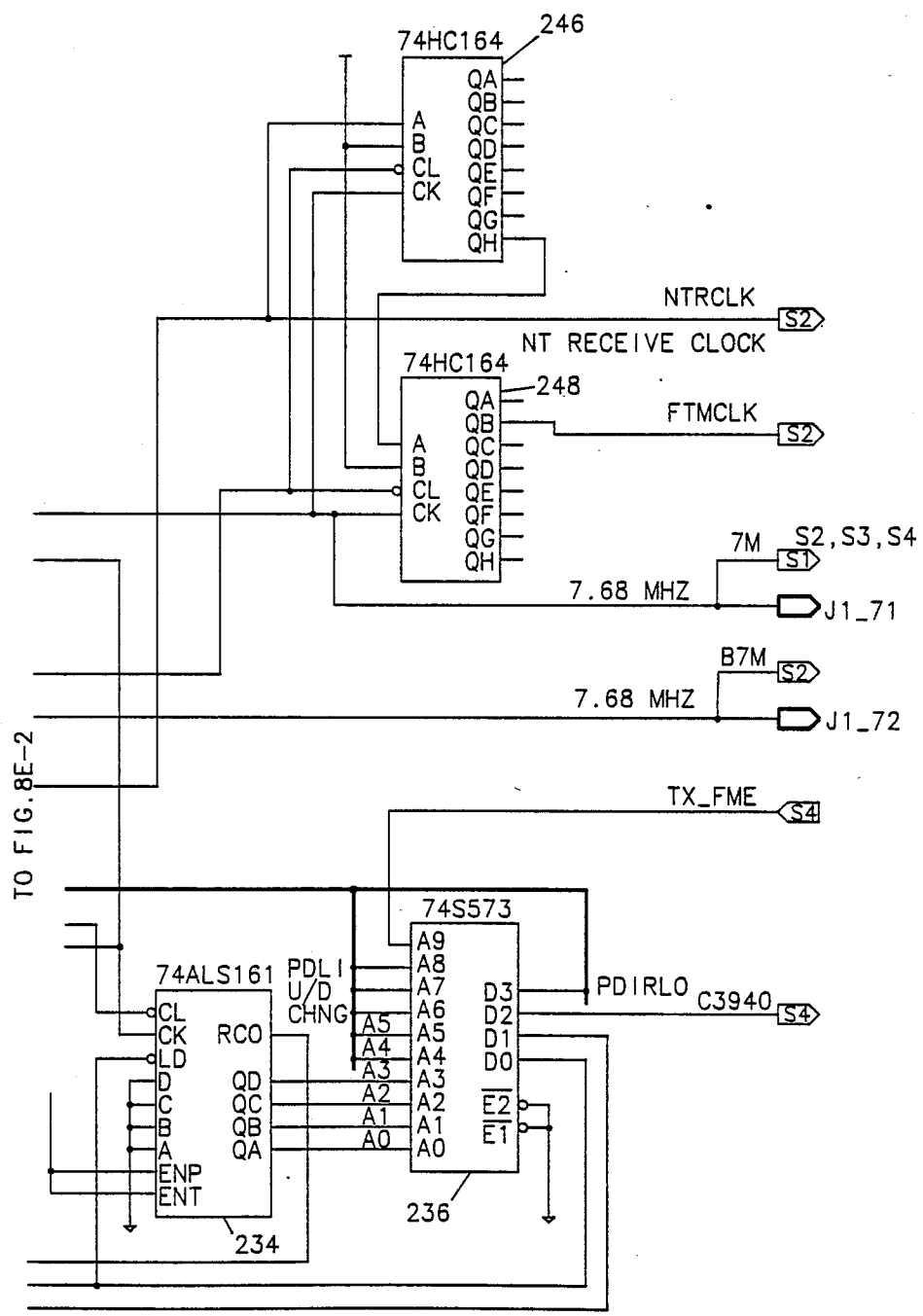

As shown in FIGS. 8E-2 and 8E-3, a system clock-generator is formed by components 238, 240, 242, 244, 246 and 248. The clock input is 15.36 MHz crystal in the TE mode and 15.36 MHz external input in the NT mode from the U-Interface. The fixed timing sampling clock FTMCLK at pin QB of component 248 can be moved to other taps for different RX sampling timings; this connection only affects NT Fixed-Timing mode.

It should be understood that various alternatives to the embodiment of the invention described herein may be employed in practicing the invention. It is intended that the following claims define the scope of the invention an that the structure within the scope of these claims and its equivalents be covered thereby.

What is claimed is:

1. A bipolar-pattern center estimator for retrieving timing information from a received signal, the center estimator comprising:
    (a) first slicer means for slicing the received signal at a first threshold level above a reference level to obtain a first signal comprising positive polar pulses;
    (b) second slicer means for slicing the received signal at a second threshold level below the reference level to obtain a second signal comprising negative polar pulses;
    (c) first filter means responsive to the first signal for generating a first filter output signal that fades toward the reference level within a given time constant to produce first triangular pulses corresponding to the positive polar pulses;
    (d) second filter means responsive to the second signal for generating a second filter output signal that fades toward the reference level within the given time constant to produce second triangular pulses corresponding to the negative polar pulses; and
    (e) means responsive to the first and second filter output signals for determining intersections of the first and second triangular pulses, the intersections corresponding to retrieved timing information.

2. A bipolar-pattern center estimator for retrieving timing information from a received signal, the center estimator comprising:
    (a) first threshold slicer means for slicing the received signal at a first threshold level to generate a first signal comprising a sequence of pulses having a first polarity with respect to a reference level;
    (b) second threshold slicer means for slicing the receiver signal at a second threshold level to generate a second signal comprising a sequence of pulses having a polarity opposite the first polarity with respect to the reference level;
    (c) means for determining the presence of a bipolar-pattern in the combination of the first and second signals by comparing the first and second signals in the time domain to identify the sequential occurrence of pulses of opposite polarity; and
    (d) means for identifying the center of the bipolar-pattern, the center being utilizable for constructing retrieved timing information.

3. A bipolar-pattern center estimator as in claim 2 and further including:
    (a) a first filter for removing noise pulses from the first signal; and
    (b) a second filter for removing noise pulses from the second signal.

4. A bipolar-pattern center estimator as in claim 3 wherein each of the first and second filters comprises a digital transverse filter for providing window integration to detect the presence of a polar pulse.

5. A bipolar-pattern center estimator for retrieving timing information from a received signal, the center estimator comprising:
    (a) first slicer means for slicing the received signal at a first threshold level above a reference level to generate a first signal comprising a sequence of positive polar pulses;
    (b) second slicer means for slicing the received signal at a second threshold level below the reference level to generate a second signal comprising a sequence of negative polar pulses;
    (c) means for determining the presence of a bipolar-pattern in the combination of the first and second signals by comparing the first and second signals in the time domain to identify the sequential occurrence of either a positive polar pulse followed by a negative polar pulse or a negative polar pulse followed by a positive polar pulse; and
    (d) means for identifying the midpoint of the bipolar-pattern, the midpoint representing a point at which the received signal crosses the reference level and corresponding to retrieved timing information.

6. A bipolar-pattern center estimator for retrieving timing information from a received signal, the center estimator comprising:

(a) first slicer means for slicing the received signal at a first threshold level above a reference level to generate a first signal comprising a sequence of positive polar pulses;

(b) second slicer means for slicing the received signal at a second threshold level below the reference level to generate a second signal comprising a sequence of negative polar pulses;

(c) a first lossless integrator for providing a Sinx/x function whereby the first signal is filtered to generate a first integrator output signal having an accumulated duty-cycle measure corresponding to the positive polar pulses over a time of one baud;

(d) a second lossless integrator for providing a Sinx/x function whereby the second signal is filtered to generate a second integrator output signal having an accumulated duty cycle measure corresponding to the negative polar pulses over a time of one baud;

(e) means for determining the presence of a bipolar-pattern in the combination of the first and second integrator output signals by comparing the first and second integrator output signals in the time domain to identify the sequential occurrence of polar pulses of opposite polarity; and (f) means for identifying the center of the bipolar-pattern, the center being utilizable for constructing retrieved timing information.

7. A bipolar-pattern center estimator as in claim 6 and further including means for distinguishing the presence of a positive polar pulse or a negative polar pulse when the respective accumulated duty-cycle measure is reached.

8. A bipolar-pattern center estimator as in claim 7 and further including means for checking the sequential occurrence of polar pulses of opposite polarity.

9. A bipolar-pattern center estimator as in claim 8 wherein the means for checking comprises (a) a first transverse filter which registers the duty-cycle measure of each positive polar pulses to generate a first filter output that fades away within a given time constant thereby producing a positive triangular pulse corresponding to each positive polar pulse;

(b) a second transverse filter which registers the duty-cycle measure of each negative polar pulse to generate a second filter output that fades away within the given time constant thereby producing a negative triangular pulse corresponding to each negative polar pulse; and (c) means for identifying intersections of the slopes of the positive and negative triangular pulses, the intersections identifying bipolar-pattern centers.

10. A bipolar-pattern center estimator as in claim 9 wherein the time constant of integration in each of the transverse filters is obtained from a sampling clock and is higher than the baud rate.

11. A bipolar-pattern center estimator as in claim 9 wherein each transverse filter integrates up to a duty cycle measure value and holds the value for $L-w$, where w is the accumulated-pulse width, and L is the length of the filter, and then fades toward zero.

* * * * *